(12) United States Patent
You et al.

(10) Patent No.: US 11,129,152 B2
(45) Date of Patent: Sep. 21, 2021

(54) METHOD AND USER EQUIPMENT FOR RECEIVING DOWLINK CONTROL INFORMATION, AND METHOD AND BASE STATION FOR TRANSMITTING DOWLINK CONTROL INFORMATION

(71) Applicant: LG ELECTRONICS INC., Seoul (KR)

(72) Inventors: Hyangsun You, Seoul (KR); Seungmin Lee, Seoul (KR); Yunjung Yi, Seoul (KR); Hanjun Park, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 15/424,750

(22) Filed: Feb. 3, 2017

(65) Prior Publication Data

US 2017/0230994 A1 Aug. 10, 2017

Related U.S. Application Data

(60) Provisional application No. 62/290,981, filed on Feb. 4, 2016, provisional application No. 62/335,616, filed on May 12, 2016, provisional application No. 62/417,298, filed on Nov. 3, 2016.

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01); *H04L 5/0007* (2013.01); *H04L 5/0044* (2013.01)

(58) Field of Classification Search
None
See application file for complete search history.

(56) References Cited

U.S. PATENT DOCUMENTS

| 10,271,328 | B2* | 4/2019 | Byun | H04L 27/2602 |
| 2011/0317655 | A1* | 12/2011 | Nakao | H04L 1/0027 370/329 |
| 2013/0051342 | A1* | 2/2013 | Aiba | H04L 1/1893 370/329 |
| 2013/0215875 | A1* | 8/2013 | Yang | H04W 72/1273 370/336 |
| 2014/0071961 | A1* | 3/2014 | Nigam | H04W 72/04 370/336 |

(Continued)

*Primary Examiner* — Christopher T Wyllie
(74) *Attorney, Agent, or Firm* — Lee, Hong, Degerman, Kang & Waimey

(57) ABSTRACT

One downlink control information DCI may be divided into first DCI and second DCI to be transmitted/received. The first DCI may be transmitted/received within a control region of a first TTI of a first time length. The first DCI may include information about the second DCI in a second TTI of a second time length shorter than the first time length. The first DCI may be transmitted/received using first decoding candidates for transmission of the first DCI among decoding candidates in the search space in the control region of the first TTI. The decoding candidates other than the first decoding candidate among the decoding candidates in the search space may be used for transmission/reception of legacy DCI.

16 Claims, 15 Drawing Sheets

(56) References Cited

U.S. PATENT DOCUMENTS

| | | | |
|---|---|---|---|
| 2014/0226607 A1* | 8/2014 | Holma | H04L 1/1812 |
| | | | 370/329 |
| 2016/0143029 A1* | 5/2016 | Goto | H04W 72/0446 |
| | | | 370/329 |
| 2017/0099127 A1* | 4/2017 | Byun | H04L 5/0053 |
| 2017/0111923 A1* | 4/2017 | Nogami | H04W 72/1263 |
| 2017/0111933 A1* | 4/2017 | Wu | H04W 72/0446 |
| 2017/0188340 A1* | 6/2017 | Andgart | H04L 5/0044 |
| 2017/0215179 A1* | 7/2017 | Choi | H04L 1/0025 |
| 2017/0251465 A1* | 8/2017 | Andersson | H04L 5/0048 |
| 2017/0251466 A1* | 8/2017 | Astely | H04L 5/0055 |
| 2017/0331547 A1* | 11/2017 | Kim | H04L 5/0012 |
| 2018/0049165 A1* | 2/2018 | Byun | H04W 72/0446 |
| 2018/0098337 A1* | 4/2018 | Lee | H04W 72/1278 |

\* cited by examiner

- [p] RE occupied by CRS of port p ( p∈0, p∈0,1 or p∈0,1,2,3 )
- ▨ RE occupied by UE-RS of port(s) p ( p∈7, p∈8, p∈7,8 or p∈7,8,11,13 )
- ☐ RE occupied by UE-RS of port(s) p ( p∈9, p∈10, p∈9,10 or p∈9,10,12,14 )

METHOD AND USER EQUIPMENT FOR RECEIVING DOWLINK CONTROL INFORMATION, AND METHOD AND BASE STATION FOR TRANSMITTING DOWLINK CONTROL INFORMATION

CROSS-REFERENCE TO RELATED APPLICATIONS

Pursuant to 35 U.S.C. § 119(e), this application claims the benefit of U.S. Provisional Application Nos. 62/290,981 filed on Feb. 4, 2016, 62/335,616 filed on May 12, 2016, and 62/417,298 filed on Nov. 3, 2016, the contents of which are all hereby incorporated by reference herein in their entirety.

TECHNICAL FIELD

The present invention relates to a wireless communication system, and more particularly, to a method and apparatus for transmitting/receiving downlink control information.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

The technical objects that can be achieved through the present invention are not limited to what has been particularly described hereinabove and other technical objects not described herein will be more clearly understood by persons skilled in the art from the following detailed description.

SUMMARY

Downlink control information (DCI) may be divided into first DCI and second DCI and transmitted/received. The first DCI may be transmitted/received within a control region of a first TTI of a first time duration. The first DCI may include information about a second DCI in a second TTI of a second time duration shorter than the first time duration. The first DCI may be transmitted/received using first decoding candidates for transmission of the first DCI among decoding candidates in the search space in the control region of the first TTI. The decoding candidates other than the first decoding candidates among the decoding candidates in the search space may be used for transmission/reception of the legacy DCI.

In one aspect of the present invention, there is provided a method of receiving downlink control information (DCI) by a user equipment. The method includes receiving first DCI on one of a plurality of decoding candidates in a search space configured in a control region of a first transmission time interval (TTI) of a first time length, and receiving second DCI within a second TTI of a second time length based on the first DCI. The first TTI may be divided into the control region and a data region following the control region in a time domain. The second time length may be shorter than the first time length. The plurality of decoding candidates may be divided into first decoding candidates and second decoding candidates. The user equipment may attempt to perform decoding on the first decoding candidates not on the second decoding candidates for reception of the first DCI.

In another aspect of the present invention, there is provided a user equipment for receiving downlink control information (DCI). The user equipment includes a radio frequency (RF) unit, and a processor configured to control the RF unit. The processor may be configured to control the RF unit to receive first DCI on one of a plurality of decoding candidates in a search space configured in a control region of a first transmission time interval (TTI) of a first time length, and control the RF unit to receive second DCI within a second TTI of a second time length based on the first DCI. The first TTI may be divided into the control region and a data region following the control region in a time domain. The second time length may be shorter than the first time length. The plurality of decoding candidates may be divided into first decoding candidates and second decoding candidates The processor may be configured to attempt to perform decoding on the first decoding candidates not on the second decoding candidates for reception of the first DCI.

In another aspect of the present invention, there is provided a method of transmitting downlink control information (DCI) by a base station. The method includes transmitting first DCI on one of a plurality of decoding candidates in a search space configured in a control region of a first transmission time interval (TTI) of a first time length, and transmitting second DCI within a second TTI of a second time length based on the first DCI. The first TTI may be divided into the control region and a data region following the control region in a time domain. The second time length may be shorter than the first time length. The plurality of decoding candidates may be divided into first decoding candidates and second decoding candidates. The first DCI may be transmitted on one of the first decoding candidates not the second decoding candidates.

In another aspect of the present invention, there is provided a base station for transmitting the downlink control information (DCI). The base station includes a radio frequency (RF) unit, and a processor configured to control the RF unit. The processor may be configured to control the RF unit to transmit first DCI on one of a plurality of decoding candidates in a search space configured in a control region of a first transmission time interval (TTI) of a first time length, and control the RF unit to transmit second DCI within a second TTI of a second time length based on the first DCI. The first TTI may be divided into the control region and a data region following the control region in a time domain. The second time length may be shorter than the first time length. The plurality of decoding candidates may be divided into first decoding candidates and second decoding candidates. The first DCI may be transmitted on one of the first decoding candidates not the second decoding candidates.

In each aspect of the present invention, the legacy DCI may be transmitted in one of the second decoding candidates. A legacy physical downlink shared channel (PDSCH) for carrying legacy downlink data may be transmitted/received within the first TTI based on the legacy DCI.

In each aspect of the present invention, the user equipment may be configured to attempt the decoding on the first decoding candidates prior to the decoding on the second decoding candidates.

In each aspect of the present invention, the second DCI may contain control information of a physical downlink shared channel (PDSCH) for carrying downlink data or the downlink data. The first DCI may include indication information indicating whether the second DCI contains the control information or the downlink data.

In each aspect of the present invention, the downlink data may be smaller than a predetermined size.

In each aspect of the present invention, the first DCI may be valid at least in the first TTI and the second DCI may be valid only within the one second TTI.

In each aspect of the present invention, the first time length may be 1 ms and the second time length may be shorter than or equal to 0.5 ms.

In each aspect of the present invention, the second TTI may be configured in the data region of the first TTI.

According to the present invention, uplink/downlink signals can be efficiently transmitted/received. Therefore, overall throughput of a radio communication system can be improved.

According to one embodiment of the present invention, a low cost/complexity UE can perform communication with a BS at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a base station may be reduce.

According to an embodiment of the present invention, a small amount of data may be efficiently transmitted/received.

BRIEF DESCRIPTION OF THE DRAWING

The accompanying drawings, which are included to provide a further understanding of the invention, illustrate embodiments of the invention and together with the description serve to explain the principle of the invention.

DETAILED DESCRIPTION

Figure 1:
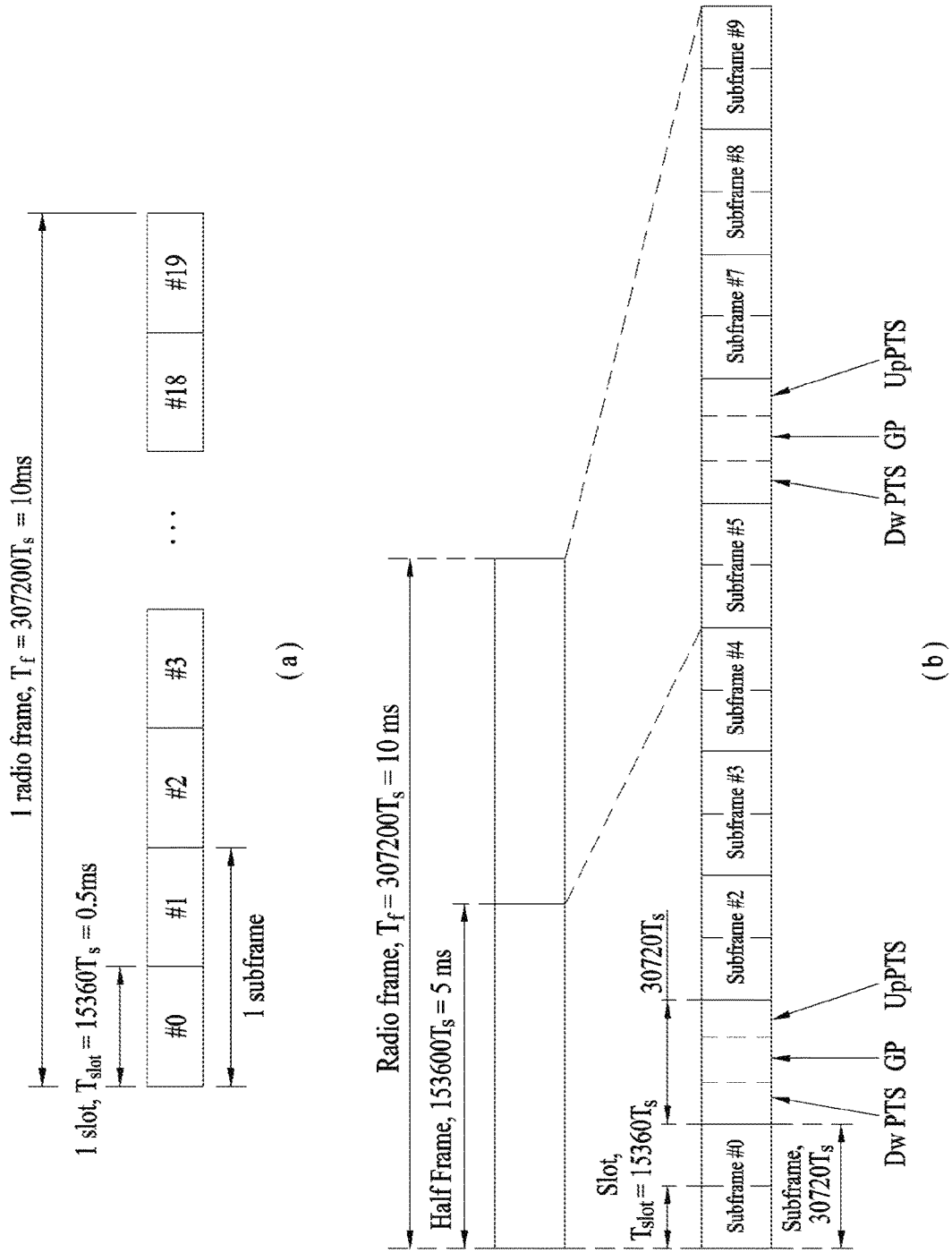
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For the terms and techniques which are used herein but not specifically described, the 3GPP LTE/LTE-A standard documents, for example, 3GPP TS 36.211, 3GPP TS 36.212, 3GPP TS 36.213, 3GPP TS 36.321 and 3GPP TS 36.331, and the like may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

TTI refers to an interval during which data may be scheduled. For example, referring to FIGS. 1 and 3, in the current LTE/LTE-A system, a opportunity of transmission of an UL grant or a DL grant is present every 1 ms, and the UL/DL grant opportunity does not exists several times in less than 1 ms. Therefore, the TTI in the current LTE/LTE-A system is 1 ms.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$  | 2192 · $T_s$ | 2560 · $T_s$ | 7680 · $T_s$  | 2192 · $T_s$ | 2560 · $T_s$ |
| 1 | 19760 · $T_s$ |              |              | 20480 · $T_s$ |              |              |
| 2 | 21952 · $T_s$ |              |              | 23040 · $T_s$ |              |              |
| 3 | 24144 · $T_s$ |              |              | 25600 · $T_s$ |              |              |
| 4 | 26336 · $T_s$ |              |              | 7680 · $T_s$  | 4384 · $T_s$ | 5120 · $T_s$ |
| 5 | 6592 · $T_s$  | 4384 · $T_s$ | 5120 · $T_s$ | 20480 · $T_s$ |              |              |
| 6 | 19760 · $T_s$ |              |              | 23040 · $T_s$ |              |              |
| 7 | 21952 · $T_s$ |              |              | 12800 · $T_s$ |              |              |
| 8 | 24144 · $T_s$ |              |              | —             | —            | —            |
| 9 | 13168 · $T_s$ |              |              | —             |              |              |

Figure 2:
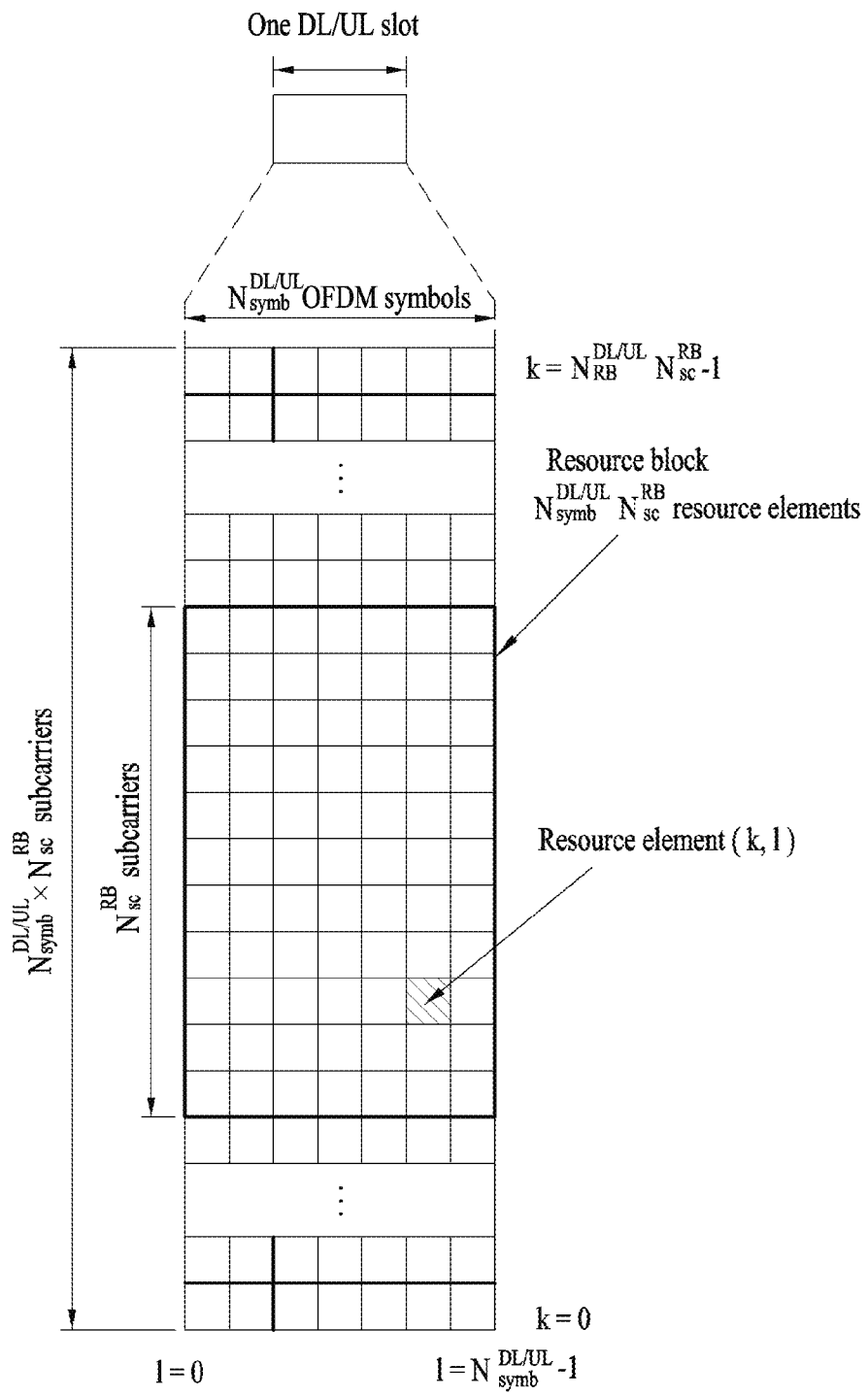
FIG. 2 illustrates the structure of a downlink (DL)/uplink (UL) slot in a wireless communication system.

FIG. 2 illustrates the structure of a DL/UL slot structure in a wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
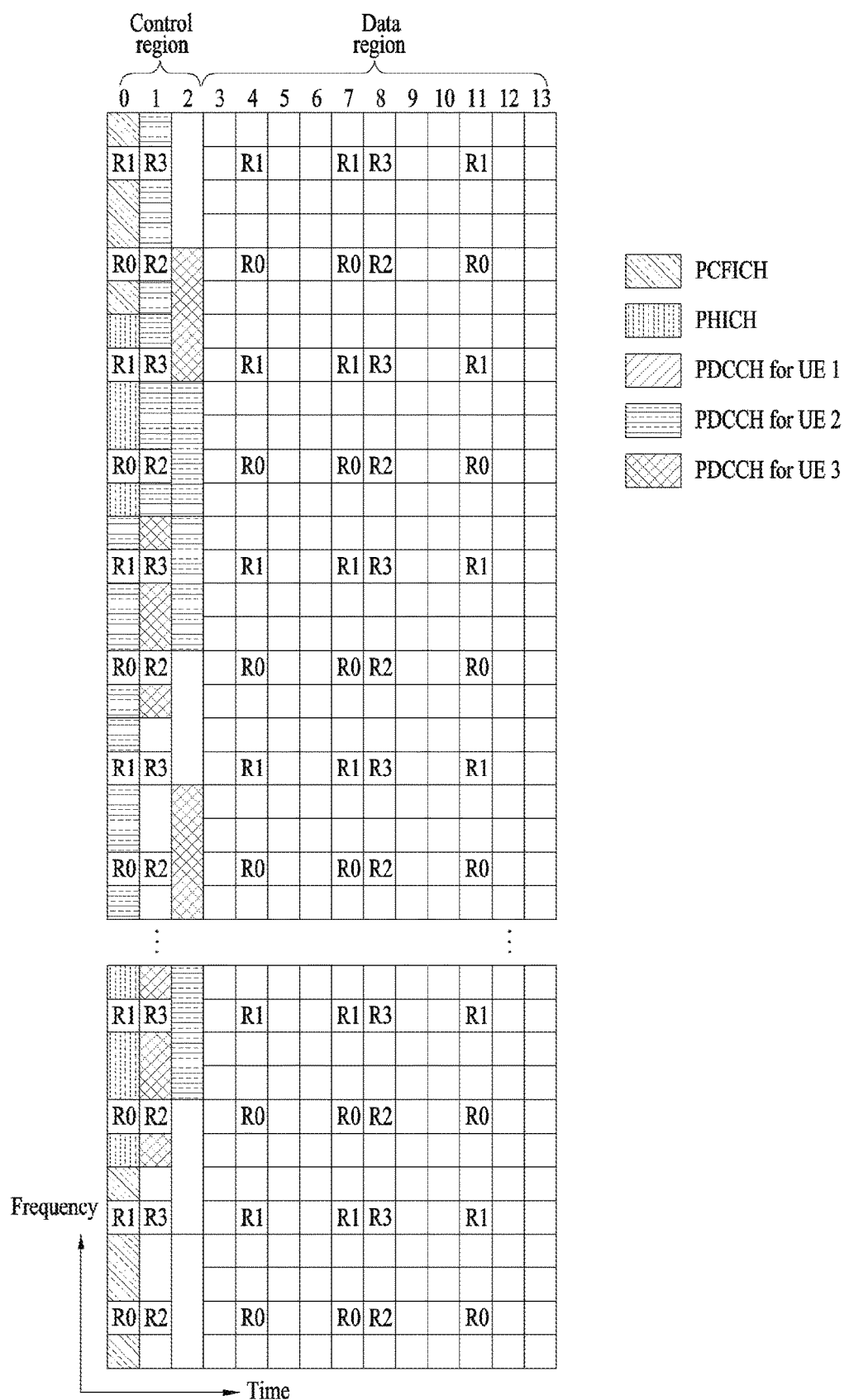
FIG. 3 illustrates the structure of a DL subframe used in a wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs. A set of OFDM symbols available for the PDCCH at a subframe is given by the following Table.

TABLE 3

| Subframe | Number of OFDM symbols for PDCCH when $N^{DL}_{RB} > 10$ | Number of OFDM symbols for PDCCH when $N^{DL}_{RB} \leq 10$ |
| --- | --- | --- |
| Subframe 1 and 6 for frame structure type 2 | 1, 2 | 2 |
| MBSFN subframes on a carrier supporting PDSCH, configured with 1 or 2 cell-specfic antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 3. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB}>10$, the number 1, 2 or 3 of OFDM symbols which are spans of DCI carried by the PDCCH is given by the CFI. For a downlink system bandwidth $N^{DL}_{RB} \leq 10$, the number 2, 3 or 4 of OFDM symbols which are spans of DCI carried by the PDCCH is given by CFI+1. The CFI is coded in accordance with the following Table.

TABLE 4

| CFI | CFI code word $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

TABLE 5

| DCI format | Description |
|---|---|
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

Other DCI formats in addition to the DCI formats defined in Table 5 may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode. Table 6 illustrates transmission modes for configuring multi-antenna technology and DCI formats for allowing a UE to perform blind decoding at the corresponding transmission mode. Particularly, Table 6 illustrates a relation between PDCCH and PDSCH configured by C-RNTI (Cell RNTI (Radio Network Temporary Identifier)).

TABLE 6

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial multiplexing or Transmit diversity |
| Mode 5 | DCI format 1A | Common and UE specific by C-RNTI | Transmit diversity |
| | DCI format 1D | UE specific by C-RNTI | Multi-user MIMO |
| Mode 6 | DCI format 1A | Common and UE specific by C-RNTI | Transmit diversity |
| | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
| | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
| | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
| | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |

TABLE 6-continued

| Transmission mode | DCI format | Search Space | Transmission scheme of PDSCH corresponding to PDCCH |
|---|---|---|---|
| | DCI format 2D | UE specific by C-RNTI | Up to 8 layer transmission, ports 7-14 or single-antenna port, port 7 or 8 |

Although transmission modes 1 to 10 are listed in Table 6, other transmission modes in addition to the transmission modes defined in Table 6 may be defined.

Referring to Table 6, a UE configured to a transmission mode 9, for example, tries to decode PDCCH candidates of a UE-specific search space (USS) to a DCI format 1A, and tries to decode PDCCH candidates of a common search space (CSS) and the USS to a DCI format 2C. The UE may decode a PDSCH in accordance with DCI based on the DCI format successfully decoded. If DCI decoding from one of a plurality of PDCCH candidates to the DCI format 1A is successfully performed, the UE may decode the PDSCH by assuming that up to 8 layers from antenna ports 7 to 14 are transmitted thereto through the PDSCH, or may decode the PDSCH by assuming that a single layer from the antenna port 7 or 8 is transmitted thereto through the PDSCH.

For example, a transmission mode is semi-statically configured for the UE by the upper layer such that the UE may receive PDSCHs transmitted according to one of a plurality of predetermined transmission modes. The UE attempts to decode the PDCCH only in DCI formats corresponding to the transmission mode thereof. In other words, in order to maintain the computational load of the UE according to blind decoding attempts below a certain level, not all DCI formats are simultaneously searched by the UE.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$. The control region of each serving cell consists of a set of CCEs, numbered from 0 to $N_{CCE,k}-1$, where $N_{CCE,k}$ is the total number of CCEs in the control region of subframe k. A PDCCH consisting of n consecutive CCEs may only start on a CCE fulfilling i mod n=0, where i is the CCE number.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs, where a search space $S^{(L)}_k$ at aggregation level $L \in \{1, 2, 4, 8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs. The following table shows an example of aggregation levels for defining SS.

TABLE 7

| Type | Search space $S^{(L)}_k$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

For each serving cell on which PDCCH is monitored, the CCEs corresponding to PDCCH candidates m of the search space $S^{(L)}_k$ are configured by "$L*\{(Y_k+m') \mod \text{floor}(N_{CCE,k}/L)\}+i$", where $i=0, \ldots, L-1$. For the common search space m'=m. For the PDCCH UE specific search space, for the serving cell on which PDCCH is monitored, if the monitoring UE is configured with carrier indicator field then $m'=m+M^{(L)}*n_{CI}$ where $n_{CI}$ is the carrier indicator field (CIF) value, else if the monitoring UE is not configured with carrier indicator field then m'=m, where m=0, 1, ..., $M^{(L)}-1$. $M^{(L)}$ is the number of PDCCH candidates to monitor at aggregation level L in the given search space. The carrier indication field value can be the same as a serving cell index (ServCellIndex). For the common search space, $Y_k$ is set to 0 for the two aggregation levels L=4 and L=8. For the UE-specific search space $S^{(L)}_k$ at aggregation level D, the variable $Y_k$ is defined by "$Y_k=(A \cdot Y_{k-1}) \mod D$", where $Y_{-1}=n_{RNTI} \neq 0$, A=39827, D=65537 and $k=\text{floor}(n_s/2)$. $n_s$ is the slot number within a radio frame.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 4:
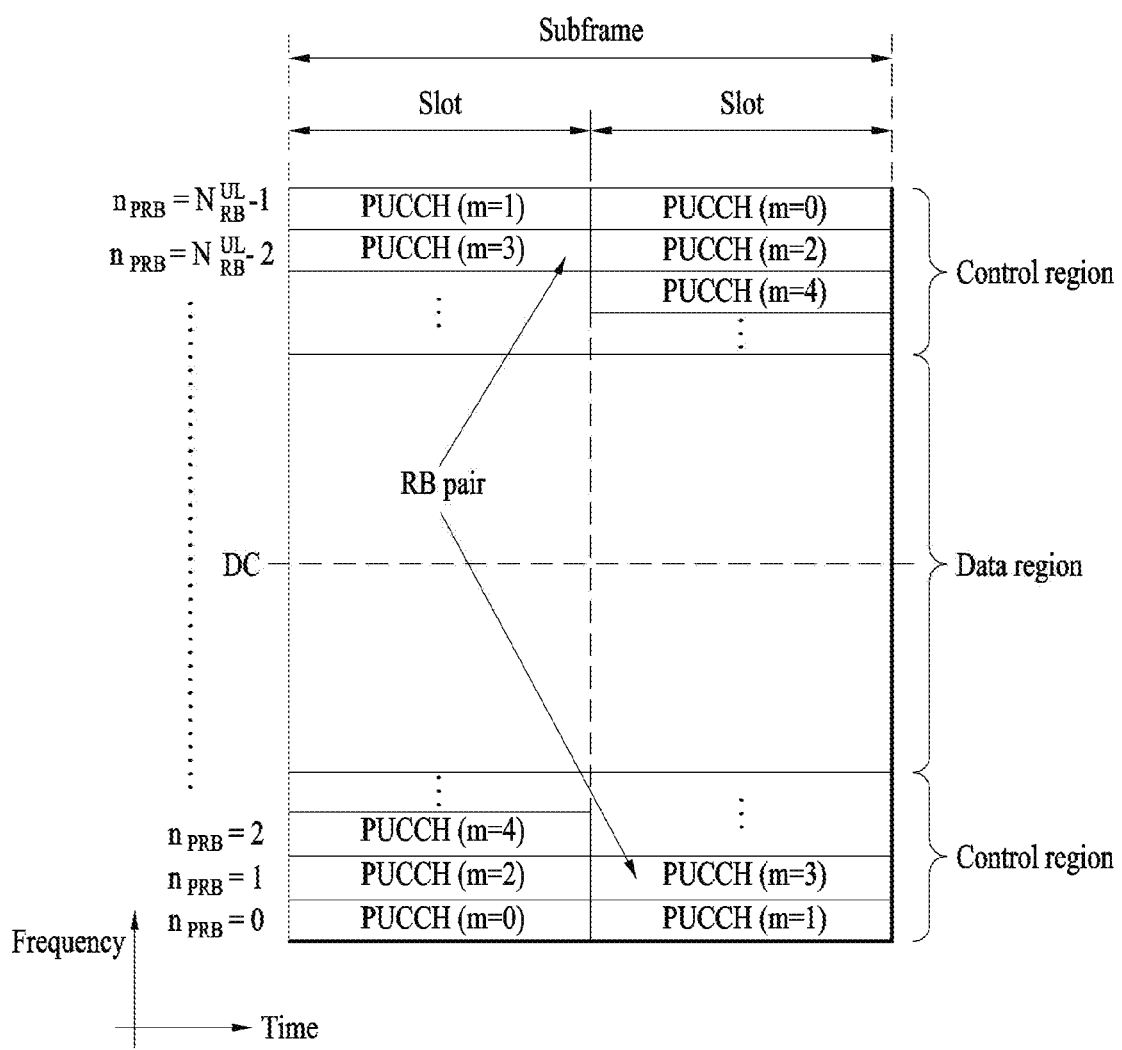
FIG. 4 illustrates the structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs may be aggregated on each of a UL and a DL to support a bandwidth of 60 MHz. The respective CCs may be contiguous or non-contiguous in the frequency domain. For convenience, although it has been described that the bandwidth of UL CC and the bandwidth of DL CC are the same as each other and symmetric to each other, the bandwidth of each CC may be independently determined. Asymmetrical carrier aggregation in which the number of UL CCs is different from the number of DL CCs may be implemented. DL/UL CC limited to a specific UE may be referred to as a serving UL/DL CC configured for the specific UE.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

A configured cell refers to a cell in which carrier aggregation is performed for a UE based on measurement report from another eNB or UE among cells of an eNB and is configured per UE. The cell configured for the UE may be a serving cell in terms of the UE. For the cell configured for the UE, i.e. the serving cell, resources for ACK/NACK transmission for PDSCH transmission are reserved in advance. An activated cell refers to a cell configured to be actually used for PDSCH/PUSCH transmission among cells configured for the UE and CSI reporting and SRS transmission for PDSCH/PUSCH transmission are performed in the activated cell. A deactivated cell refers to a cell configured not to be used for PDSCH/PUSCH transmission by the command of an eNB or the operation of a timer and, if a cell is deactivated, CSI reporting and SRS transmission are also stopped in the cell.

For reference, a carrier indicator (CI) denotes a serving cell index (ServCellIndex), CI=0 is applied to Pcell. The serving cell index is a short ID used to identify a serving cell. For example, any one of integers from 0 to 'maximum number of carrier frequencies which can be configured for the UE at a time–1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

In legacy systems subject to communication with one node, the UE-RS, CSI-RS, and CRS are transmitted at the same location, and therefore the UE does not consider a situation in which delay spread, Doppler spread, frequency shift, average received power, and received timing differ among the UE-RS port(s), CSI-RS port(s) and CRS port(s0. However, for a communication system to which coordinated Multi-Point (CoMP) communication technology allowing more than one node to simultaneously participate in communication with the UE is applied, the properties may differ among the PDCCH port(s), PDSCH port(s), UE-RS port(s), CSI-RS port(s) and/or CRS port(s). For this reason, the concept of a "quasi co-located antenna port" is introduced for a mode (hereinafter, CoMP mode) in which multiple nodes can participate in communication.

With respect to antenna ports, the term "Quasi co-located (QCL)" or "quasi co-location (QCL)" can be defined as follows: if two antenna ports are QCL, the UE may assume that the large-scale properties of a signal received through one of the two antenna ports can be inferred from the signal received through the other antenna port. The large-scale properties include delay spread, Doppler spread, frequency shift, average received power and/or received timing.

With respect to channels, the term QCL may also be defined as follows: if two antenna ports are QCL, the UE may assume that the large-scale properties of a channel for conveying a symbol on one of the two antenna ports can be inferred from the large-scale properties of a channel for conveying a symbol on the other antenna port. The large-scale properties include delay spread, Doppler spread, Doppler shift, average gain and/or average delay.

One of the two definitions of QCL given above may be applied to the embodiments of the present invention. Alternatively, the definition of QCL may be modified to assume that antenna ports for which QCL assumption is established are co-located. For example, QCL may be defined in a manner that the UE assumes that the antenna ports for which QCL assumption is established are antenna ports of the same transmission point.

For non-quasi co-located (NQC) antenna ports, the UE cannot assume the same large-scale properties between the antenna ports. In this case, a typical UE needs to perform independent processing for each NQC antenna with respect to timing acquisition and tracking, frequency offset estimation and compensation, and delay estimation and Doppler estimation.

On the other hand, for antenna ports for which QCL assumption can be established, the UE performs the following operations:

Regarding Doppler spread, the UE may apply the results of estimation of the power-delay-profile, the delay spread and Doppler spectrum and the Doppler spread for one port to a filter (e.g., a Wiener filter) which is used for channel estimation for another port;

Regarding frequency shift and received timing, after performing time and frequency synchronization for one port, the UE may apply the same synchronization to demodulation on another port;

Further, regarding average received power, the UE may average measurements of reference signal received power (RSRP) over two or more antenna ports.

For example, if the UE receives a specific DMRS-based DL-related DCI format (e.g., DCI format 2C) over a PDCCH/EPDCCH, the UE performs data demodulation after performing channel estimation of the PDSCH through a configured DMRS sequence. If the UE can make an assumption that a DMRS port configuration received through the DL scheduling grant and a port for a specific RS (e.g., a specific CSI-RS, a specific CRS, a DL serving cell CRS of the UE, etc.) port are QCL, then the UE may apply the estimate(s) of the large-scale properties estimated through the specific RS port to channel estimation through the DMRS port, thereby improving processing performance of the DMRS-based receiver.

Figure 5:
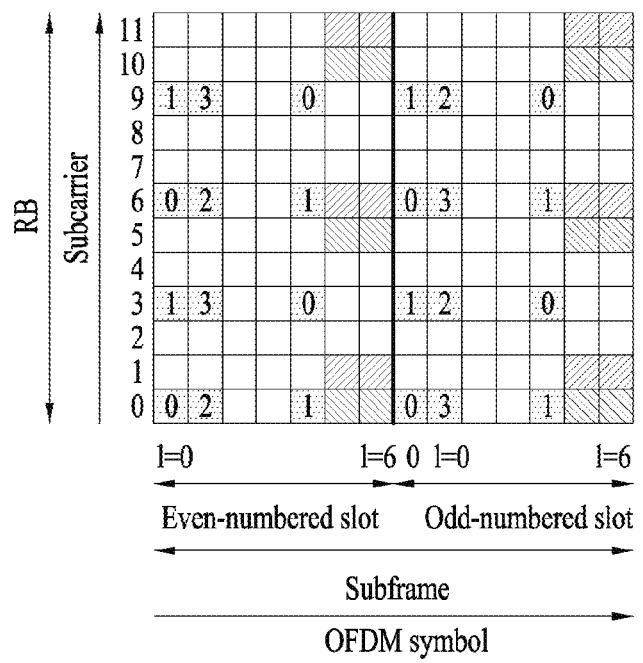
FIG. 5 illustrates configuration of cell specific reference signals (CRSs) and user specific reference signals (UE-RS).

FIG. 5 illustrates configuration of cell specific reference signals (CRSs) and user specific reference signals (UE-RS). In particular, FIG. 5 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

Referring to FIG. 5, the CRS is transmitted through antenna ports p=0, p=0, 1, p=0, 1, 2, 3 in accordance with the number of antenna ports of a transmission mode. The CRS is fixed to a certain pattern within a subframe regardless of a control region and a data region. The control channel is allocated to a resource of the control region, to which the CRS is not allocated, and the data channel is also allocated to a resource of the data region, to which the CRS is not allocated.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

Referring to FIG. 5, UE-RSs are transmitted on antenna port(s) p=5, p=7, p=8 or p=7, 8, . . . , υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

In the 3GPP LTE-A system, the UE-RSs are defined in a PRB pair. Referring to FIG. 5, in a PRB having frequency-domain index $n_{PRB}$ assigned for PDSCH transmission with respect to p=7, p=8, or p=7, 8, . . . , υ+6, a part of UE-RS sequence r(m) is mapped to complex-valued modulation symbols $a^{(p)}_{k,l}$ in a subframe according to the following equation.

$$a_{k,l}^{(p)} = w_p(l') \cdot r(3 \cdot l' \cdot N_{RB}^{max,DL} + 3 \cdot n_{PRB} + m') \qquad \text{Equation 1}$$

where $w_p(i)$, l', m' are given as follows.

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases} \qquad \text{Equation 2}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with con-} \\ & \text{figuration 3, 4, 8, or 9 (see Table 2)} \\ l' \bmod 2 + 2 + & \text{if in a special subframe with con-} \\ 3\lfloor l'/2 \rfloor & \text{figuration 1, 2, 6, or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe} \\ & \text{with configuration 1, 2, 6 or 7 (see Table 2)} \\ 0, 1 & \text{if } n_s \bmod 2 = 0 \text{ and not in special subframe} \\ & \text{with configuration 1, 2, 6 or 7 (see Table 2)} \\ 2, 3 & \text{if } n_s \bmod 2 = 1 \text{ and not in special subframe} \\ & \text{with configuration 1, 2, 6 or 7 (see Table 2)} \end{cases}$$

$$m' = 0, 1, 2$$

where $n_s$ is the slot number within a radio frame and an integer among 0 to 19. The sequence $\overline{w}_p(i)$ for normal CP is given according to the following equation.

TABLE 8

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p∈{7, 8, . . . , υ+6}, the UE-RS sequence r(m) is defined as follows.

$$r(m) = \frac{1}{\sqrt{2}}(1 - 2 \cdot c(2m)) + j\frac{1}{\sqrt{2}}(1 - 2 \cdot c(2m+1)), \qquad \text{Equation 3}$$

$$m = \begin{cases} 0, 1 \ldots, 12N_{RB}^{max,DL} - 1 & \text{normal cyclic prefix} \\ 0, 1 \ldots, 16N_{RB}^{max,DL} - 1 & \text{extended cyclic prefix} \end{cases}$$

where c(i) is a pseudo-random sequence defined by a length-31 Gold sequence. The output sequence c(n) of length $M_{PN}$, where n=0, 1, . . . , $M_{PN}$−1, is defined by the following equation.

$$c(n)=(x_1(n+n_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{Equation 4}$$

where $N_C=1600$ and the first m-sequence is initialized with $x_1(0)=1$, $x_1(n)=0$, $n=1, 2, \ldots, 30$. The initialization of the second m-sequence is denoted by $c_{init}=\Sigma_{i=0}^{30} x_2(i) \cdot 2^i$ with the value depending on the application of the sequence.

In Equation 3, the pseudo-random sequence generator for generating c(i) is initialized with $c_{init}$ at the start of each subframe according to the following equation.

$$c_{init}=(\lfloor n_s/2 \rfloor+1) \cdot (2n_{ID}^{(nSCID)}+1) \cdot 2^{16}+n_{SCID} \quad \text{Equation 5}$$

where the quantities $n^{(i)}_{ID}$, i=0, 1, which is corresponding to $n^{(nSCID)}_{ID}$, are given by a physical layer cell identity $N^{cell}_{ID}$ no value for a scrambling identity $n^{DMRS,i}_{ID}$ is provided by higher layers or if DCI format 1A, 2B or 2C is used for DCI format associated with the PDSCH transmission, and given by $n^{DMRS,i}_{ID}$ otherwise.

In Equation 5, the value of $n_{SCID}$ is zero unless specified otherwise. For a PDSCH transmission on antenna ports 7 or 8, $n_{SCID}$ is given by the DCI format 2B or 2C. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH)

Figure 6:
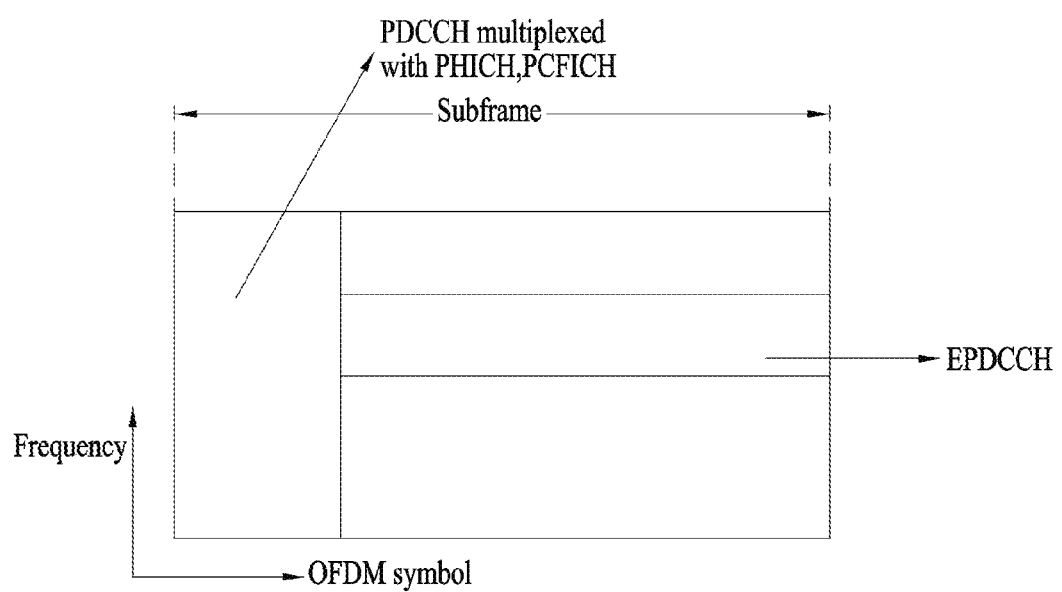
FIG. 6 is an example of a downlink control channel configured in a data region of a DL subframe.

FIG. 6 is a example of a downlink control channel configured in a data region of a DL subframe.

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port $p \in \{107, 108, 109, 110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE shall monitor a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

An EPDCCH UE-specific search space $ES^{(L)}_k$ at aggregation level $L \in \{1, 2, 4, 8, 16, 32\}$ is defined by a set of EPDCCH candidates.

For an EPDCCH-PRB-set p, the ECCEs corresponding to EPDCCH candidate m of the search space $ES^{(L)}_k$ are given by the following equation.

$$L\left\{\left(Y_{p,k} + \left\lfloor \frac{m \cdot N_{ECCE,p,k}}{L \cdot M^{(L)}_p} \right\rfloor + b\right) \bmod \lfloor N_{ECCE,p,k}/L \rfloor\right\} + i \quad \text{Equation 6}$$

where $i=0, \ldots, L-1$. $b=n_{CI}$ if the UE is configured with a carrier indicator field for the serving cell on which EPDCCH is monitored, otherwise b=0. $n_{CI}$ is the carrier indicator field (CIF) value, which is the same as a serving cell index (ServCellIndex). $m=0, 1, \ldots, M^{(L)}_p-1$, $M^{(L)}_p$ is the number of EPDCCH candidates to monitor at aggregation level L in EPDDCH-PRB-set p. The variable $Y_{p,k}$ is defined by '$Y_{p,k}=(A_p \cdot Y_{p,k-1}) \bmod D$', where $Y_{p,k-1}=n_{RNTI} \neq 0$, $A_0=39827$, $A_0=39829$, $D=65537$ and $k=\text{floor}(n_s/2)$. $n_s$ is the slot number within a radio frame.

A UE is not expected to monitor an EPDCCH candidate, if an ECCE corresponding to that EPDCCH candidate is mapped to a PRB pair that overlaps in frequency with a transmission of either PBCH or PSS/SSS in the same subframe.

An EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter, EPDCCH DMRS) for demodulation of the EPDCCH, in a physical resource-block pair cyclically from 0 to 15 in an increasing order of first frequency. Therefore, all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

The number of ECCEs used for one EPDCCH depends on the EPDCCH format as given by Table 9, the number of EREGs per ECCE is given by Table 10. Table 9 shows an example of supported EPDCCH formats, and Table 10 shows an example of the number of EREGs per ECCE, $N^{EREG}_{ECCE}$. Both localized and distributed transmission is supported.

TABLE 9

Number of ECCEs for one EPDCCH, $N^{EPDCCH}_{ECCE}$

| EPDCCH format | Case A | | Case B | |
|---|---|---|---|---|
| | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 10

| Normal cyclic prefix | | Extended cyclic prefix | |
|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

An EPDCCH can use either localized or distributed transmission, differing in the mapping of ECCEs to EREGs and PRB pairs. One or two sets of PRB pairs which a UE shall monitor for EPDCCH transmissions can be configured. All EPDCCH candidates in EPDCCH set $S_p$ (i.e., EPDCCH-PRB-set) use either only localized or only distributed transmission as configured by higher layers. Within EPDCCH set $S_p$ in subframe k, the ECCEs available for transmission of EPDCCHs are numbered from 0 to $N_{ECCE,p,k}-1$. ECCE number n is corresponding to the following EREG(s):

EREGs numbered (n mod $N^{ECCE}_{RB}$)+$jN^{ECCE}_{RB}$ in PRB index floor(n/$N^{ECCE}_{RB}$) for localized mapping, and EREGs numbered floor (n/$N^{Sm}_{RB}$)+$jN^{ECCE}_{RB}$ in PRB indices (n+jmax(1,$N^{Sp}_{RB}/N^{EREG}_{ECCE}$))mod$N^{Sp}_{RB}$ for distributed mapping, where j=0, 1, . . . ,$N^{EREG}_{ECCE}-1$, $N^{EREG}_{ECCE}$ is the number of EREGs per ECCE, and $N^{ECCE}_{RB}=16/N^{EREG}_{ECCE}$ is the number of ECCEs per RB pair. The PRB pairs constituting EPDCCH set $S_p$ are assumed to be numbered in ascending order from 0 to $N^{Sp}_{RB}-1$.

Case A in Table 9 applies when:

DCI formats 2, 2A, 2B, 2C or 2D is used and $N^{DL}_{RB} \geq 25$, or any DCI format when $n_{EPDCCH}<104$ and normal cyclic prefix is used in normal subframes or special subframes with configuration 3, 4, 8.

Otherwise case 2 is used. The quantity $n_{EPDCCH}$ for a particular UE is defined as the number of downlink resource elements (k,l) in a PRB pair configured for possible EPDCCH transmission of EPDCCH set $S_0$ and fulfilling all of the following criteria, they are part of any one of the 16 EREGs in the physical resource-block pair, they are assumed by the UE not to be used for CRSs or CSI-RSs, the index l in a subframe fulfils $l \geq l_{EPDCCHStart}$.

where $l_{EPDCCHStart}$ is given based on higher layer signaling 'epdcch-StartSymbol-rll', higher layer signaling 'pdsch-Start-rll', or CFI value carried by PCFICH.

The mapping to resource elements (k,l) on antenna port p meeting the criteria above is in increasing order of first the index k and then the index l, starting with the first slot and ending with the second slot in a subframe.

For localized transmission, the single antenna port p to use is given by Table 11 with n'=$n_{ECCE,low}$ mod $N^{ECCE}_{RB}$+ $n_{RNTI}$ mod min($N^{ECCE}_{EPDCCH},N^{ECCE}_{RB}$) where $n_{ECCE,low}$ is the lowest ECCE index used by this EPDCCH transmission in the EPDCCH set, $n_{RNTI}$ corresponds to the RNTI associated with the EPDCCH transmission, and $N^{ECCE}_{EPDCCH}$ is the number of ECCEs used for this EPDCCH.

TABLE 11

| | Normal cyclic prefix | | Extended cyclic prefix |
|---|---|---|---|
| n' | Normal subframes, Special subframes, configurations 3, 4, 8 | Special subframes, configurations 1, 2, 6, 7, 9 | Any subframe |
| 0 | 107 | 107 | 107 |
| 1 | 108 | 109 | 108 |
| 2 | 109 | — | — |
| 3 | 110 | — | — |

For distributed transmission, each resource element in an EREG is associated with one out of two antenna ports in an alternating manner where p∈{107,109} for normal cyclic prefix and p∈{107,108} for extended cyclic prefix Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

As one method of reducing the cost of an MTC UE, the MTC UE may operate in, for example, a reduced DL and UL bandwidths of 1.4 MHz regardless of the system bandwidth when the cell operates. In this case, a sub-band (i.e., narrowband) in which the MTC UE operates may always be positioned at the center of a cell (e.g., 6 center PRBs) as shown in FIG. 6 (a), or multiple sub-bands for MTC may be provided in one subframe to multiplex MTC UEs in the subframe such that the UEs use different sub-bands or use the same sub-band which is not a sub-band consisting of the 6 center PRBs.

In this case, the MTC UE may not normally receive a legacy PDCCH transmitted through the entire system bandwidth, and therefore it may not be preferable to transmit a PDCCH for the MTC UE in an OFDM symbol region in which the legacy PDCCH is transmitted, due to an issue of multiplexing with a PDCCH transmitted for another UE. As one method to address this issue, introduction of a control channel transmitted in a sub-band in which MTC operates for the MTC UE is needed. As a DL control channel for such low-complexity MTC UE, a legacy EPDCCH may be used. Alternatively, an M-PDCCH, which is a variant of the legacy PDCCH/EPDCCH, may be introduced for the MTC UE.

A data channel (e.g., PDSCH, PUSCH) and/or control channel (e.g., M-PDCCH, PUCCH, PHICH) may be transmitted across multiple subframes to implement coverage enhancement (CE) of the UE, using a repetition technique or TTI bundling technique. On behalf of the CE, a control/data channel may be transmitted additionally using techniques such as cross-subframe channel estimation and frequency (narrowband) hopping. Herein, the cross-subframe channel estimation refers to a channel estimation technique using not only a reference signal in a subframe having a corresponding channel but also a reference signal in neighboring subframe(s).

The MTC UE may need CE up to, for example, 15 dB. However, not all MTC UEs are present in an environment which requires CE. In addition, the QoS requirements for MTC UEs are not identical. For example, devices such as a sensor and a meter have a low mobility and a small amount of data to transmit/receive and are very likely to be positioned in a shaded area. Accordingly, such devices may need high CE. On the other hand, wearable devices such as a smart watch may have mobility and are very likely to have a relatively large amount of data to transmit/receive and to be positioned in a place other than the shaded area. Accordingly, not all MTC UEs need a high level of CE, and the required capability may depend on the type of an MTC UE.

According to LTE-A Rel-13, CE may be divided into two modes. In a first mode (referred to as CE mode A), transmission may not be repeated or may be repeated only a few times. In a second mode (or CE mode B), many repetitions of transmission are allowed. A mode to enter between the two modes may be signaled to the MTC UE. Herein, parameters that a low-complexity/low-cost UE assumes for transmission/reception of a control channel/data channel may depend on the CE mode. In addition, the DCI format which the low-complexity/low-cost UE monitors may depend on the CE mode. Transmission of some physical channels may be repeated the same number of times regardless of whether the CE mode is CE mode A or CE mode B.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

In embodiments of the present invention described below, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

Figure 7:
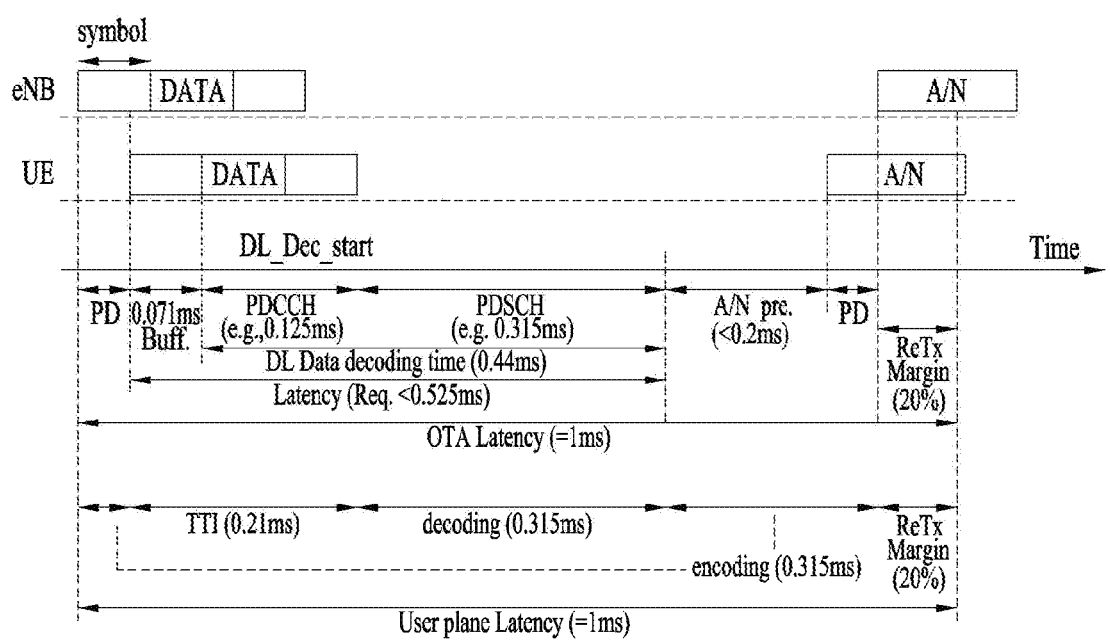
FIG. 7 illustrates the length of a transmission time interval (TTI) which is needed to implement low latency.

FIG. 7 illustrates the length of a transmission time interval (TTI) which is needed to implement low latency.

Referring to FIG. 7, a propagation delay (PD), a buffering time, a decoding time, an A/N preparation time, an uplink PD, and an OTA (over the air) delay according to a retransmission margin are produced while a signal transmitted from the eNB reaches the UE, the UE transmits an A/N for the signal, and the A/N reaches the eNB. To satisfy low latency, a shortened TTI (sTTI) shorter than or equal to 0.5 ms needs to be designed by shortening the TTI, which is the smallest unit of data transmission. For example, to shorten the OTA delay, which is a time taken from the moment the eNB starts to transmit data (PDCCH and PDSCH) until the UE completes transmission of an A/N for the data to the eNB, to a time shorter than 1 ms, the TTI is preferably set to 0.21 ms. That is, to shorten the user plane (U-plane) delay to 1 ms, the sTTI may be set in the unit of about three OFDM symbols.

While FIG. 7 illustrates that the sTTI is configured with three OFDM symbols to satisfy 1 ms as the OTA delay or U-plane delay, an sTTI shorter than 1 ms may also be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI, namely the channel band or system band of the TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. In addition, in the following description, a physical downlink control channel/physical downlink data channel/physical uplink control channel/physical uplink data channel transmitted in units of the default/main TTI are referred to as a PDCCH/PDSCH/PUCCH/PUSCH, and a PDCCH/PDSCH/PUCCH/PUSCH transmitted within an sTTI or in units of sTTI are referred to as sPDCCH/sPDSCH/sPUCCH/sPUSCH. In the new RAT environment, the numerology may be changed, and thus a default/main TTI different from that for the current LTE/LTE-A system may be used. However, for simplicity, the default/main TTI will be referred to as a TTI, subframe, legacy TTI or legacy subframe, and a TTI shorter than 1 ms will be referred to as an sTTI, on the assumption that the time length of the default/main TTI is 1 ms. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

Figure 8:
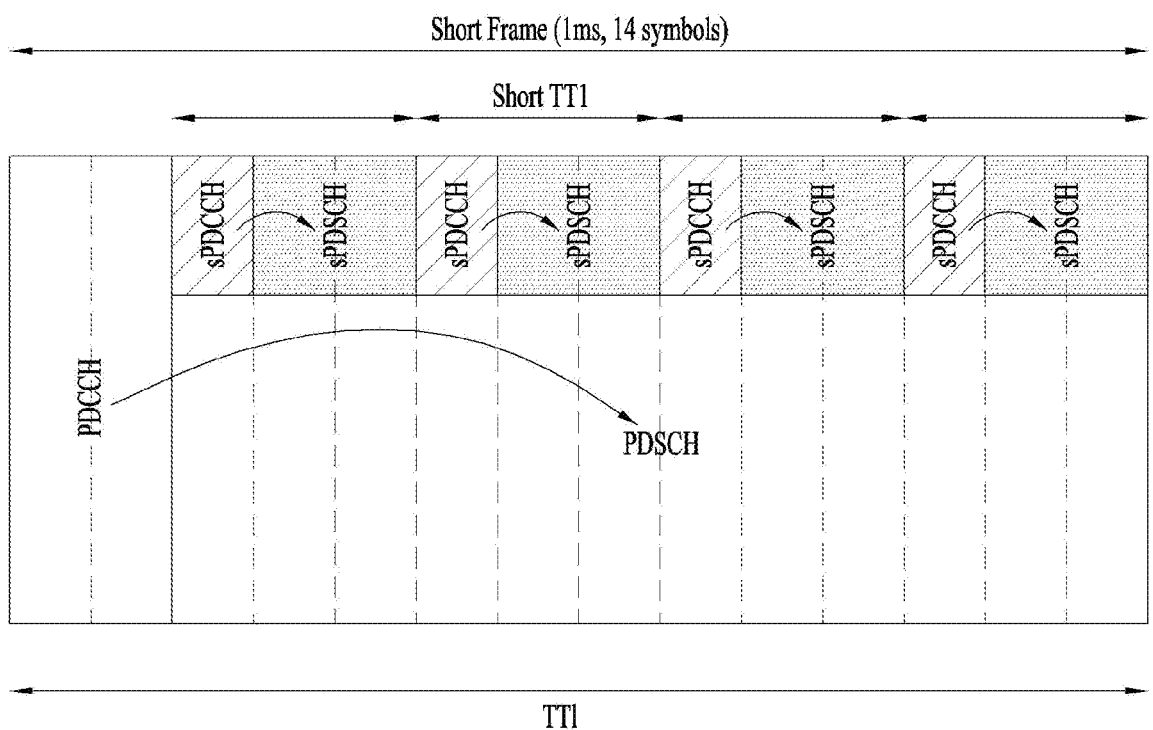
FIG. 8 illustrates an example of a short TTI and an example of transmission of a control channel and a data channel in a short TTI.

FIG. 8 illustrates an sTTI and transmission of a control channel and data channel within the sTTI.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 8, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

The present invention is directed to a method of providing a plurality of different services in one system by applying different system parameters according to the services or UEs to satisfy the requirements for the services. In particular, for a service/UE sensitive to latency, an sTTI may be used to send data in a short time and to allow a response to the data to be sent in a short time. Thereby, the latency may be reduced as much as possible. On the other hand, for a service/UE which is less sensitive to latency, a longer TTI may be used to transmit/receive data. For a service/UE which is sensitive to power efficiency rather than to latency, data may be repeatedly transmitted at the same low power or may be transmitted in units of a longer TTI. The present invention proposes a transmission method and multiplexing method for controlling information and data signals to enable the operations described above. The proposed methods are associated with the transmission aspect of a network, the reception aspect of a UE, multiplexing of multiple TTIs in one UE, and multiplexing of multiple TTIs between multiple UEs.

In contrast with the legacy LTE/LTE-A system, in which the length of a TTI is fixed to 1 ms, and thus all UEs and eNB perform signal transmission and reception in units of 1 ms, the present invention supports a system which has multiple TTI lengths, and one UE and one eNB may transmit and receive a signal using multiple TTI lengths. In particular, the present invention proposes a method of enabling the eNB and UE to communicate with each other while supporting various TTI lengths and variability when the TTI length is variable and a method of performing multiplexing for each channel and UE. While description of the present invention below is based on the legacy LTE-/LTE-A system, it is also applicable to systems other than the LTE/LTE-A system or RAT.

Figure 9:
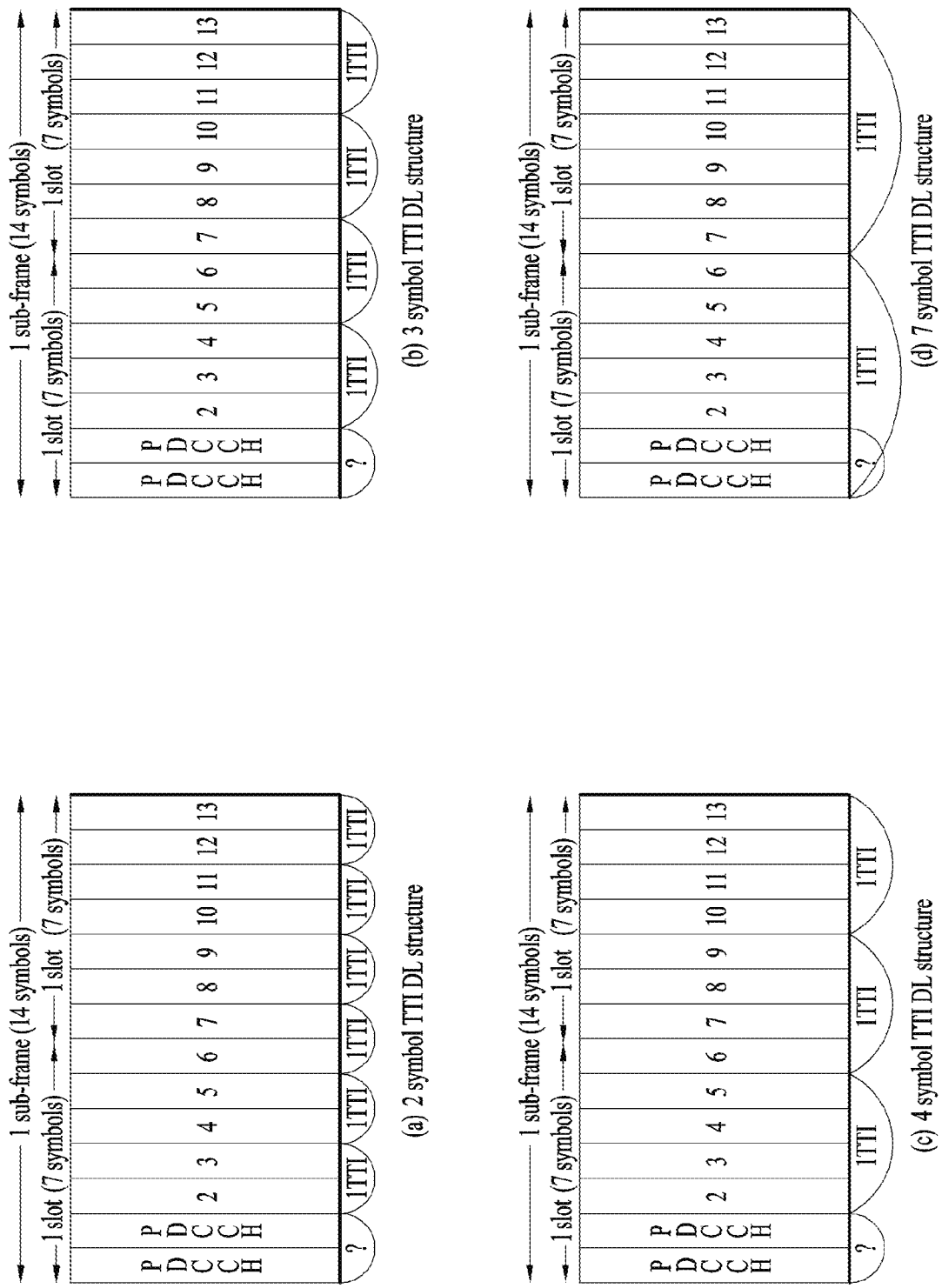
FIG. 9 illustrates an example of short TTIs configured in a legacy subframe.

FIG. 9 illustrates an example of short TTIs configured in a legacy subframe.

In legacy LTE/LTE-A, if a subframe of 1 ms has a normal CP, the subframe consists of 14 OFDM symbols. If a TTI shorter than 1 ms is configured, a plurality of TTIs may be configured within one subframe. As shown in FIG. 9, each TTI may consist of, for example, 2 symbols, 3 symbols, 4 symbols, or 7 symbols. Although not shown in FIG. 9, a TTI consisting of one symbol may also be considered. If one symbol is one TTI unit, 12 TTIs may be configured in the default TTI of 1 ms, on the assumption that the legacy PDCCH is transmittable within two OFDM symbols. Similarly, when the two leading OFDM symbols are assumed to be the legacy PDCCH region, and two symbols are taken as one TTI unit, 6 TTIs may be configured within the default TTI. If three symbols are taken as one TTI, 4 TTIs may be configured within the default TTI. If 4 symbols are taken as one TTI unit, 3 TTIs may be configured within the default TTI.

If the 7 symbols are configured as one TTI, a TTI consisting of 7 leading symbols including the legacy PDCCH region and a TTI consisting of 7 subsequent symbols may be configured. In this case, if one TTI consists of 7 symbols, a UE supporting the short TTI assumes that the two leading OFDM symbols on which the legacy PDCCH is transmitted are punctured or rate-matched and the data and/or control channels of the UE are transmitted on the five subsequent symbols in the TTI (i.e., the TTI of the first slot) positioned at the leading part of one subframe (i.e., default TTI). On the other hand, the UE may assume that the data and/or control channels can be transmitted on all 7 symbols in a TTI positioned at the rear part of the same subframe (i.e., the TTI of the second slot) without any rate-matched or punctured resource region.

Puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

Embodiments of the present invention described below may be applied to a new radio access technology (RAT) system in addition to the 3GPP LTE/LTE-A system. As more and more communication devices demand larger communication capacity, there is a need for improved mobile broadband communication compared to existing RAT. Also, massive MTC, which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC, and URLLC (Ultra-Reliable and Low Latency Communication), is being discussed. In the present invention, this technology is referred to as new RAT for simplicity.

<OFDM Numerology>

The new RAT system uses an OFDM transmission scheme or a similar transmission scheme. For example, the new RAT system may follow the OFDM parameters defined in the following table.

TABLE 12

| Parameter | Value |
| --- | --- |
| Subcarrier-spacing (Δf) | 75 kHz |
| OFDM symbol length | 13.33 us |
| Cyclic Prefix(CP) length | 1.04 us/0/94 us |
| System BW | 100 MHz |
| No. of available subcarriers | 1200 |
| Subframe length | 0.2 ms |
| Number of OFDM symbol per Subframe | 14 symbols |

<Self-Contained Subframe Structure>

Figure 10:
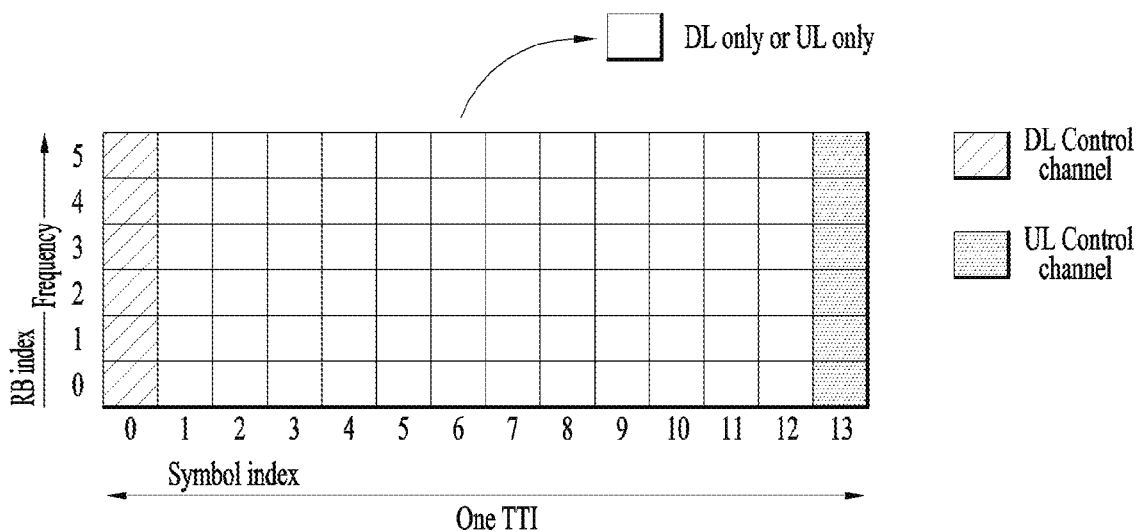
FIG. 10 illustrates a self-contained subframe structure.

FIG. 10 illustrates a self-contained subframe structure.

In order to minimize the latency of data transmission in the TDD system, a self-contained subframe structure is considered in the new fifth-generation RAT.

In FIG. 10, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 10, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

The sPDCCH referred to in the present invention may include a PDCCH transmitted in the new RAT environment as well as a PDCCH transmitted in an sTTI in the LTE/LTE-A system.

When data is transmitted/received in a shortened TTI, two-level DCI may be taken into consideration as a technique for smoothly transmitting the sPDCCH within the sTTI by reducing the DCI size. Alternatively, a two-level DCI may be considered in the new RAT to reduce the number of times of blind decoding/detection of the UE or to reduce the resources in the search space of the control channel. Two-level DCI means that DCI for scheduling data is divided in two or that information necessary for receiving sPDCCH and sPDSCH/sPUSCH is divided into two DCIs when transmitted. In the present invention, these two DCIs are respectively referred to as first DCI and second DCI or as slow DCI and fast DCI. These two DCIs may be transmitted on different (s)PDCCHs or on different control channels.

In this case, the first DCI may provide information that does not change in at least one subframe. For example, it may be transmitted over an sPDCCH/PDCCH or a legacy PDCCH transmitted in a legacy PDCCH OFDM symbols region. The second DCI may be DCI transmitted through sPDCCH within each sTTI and may contain dynamic configuration information related to the data transmission scheduled by the sPDCCH. First DCI is carried in a legacy PDCCH region and transmitted at most once per subframe, and second DCI is carried by sPDCCH and transmitted within a sTTI. For example, in the first DCI, the transmission resources of the sPDSCH/sPUSCH scheduled in the corresponding subframe may be configured. In the second DCI, the scheduling status of the sPDSCH/sPUSCH and a specific MCS value may be configured. When the first DCI is transmitted, the configuration carried by the first DCI may be applied only in the subframe in which the first DCI is transmitted. Alternatively, the UE may determine that the configuration is still valid until the next configuration is transmitted. More generally, the first level DCI (i.e., first DCI) and the second level DCI (i.e., second DCI) may be transmitted on the same channel or different channels, and the second level DCI may be transmitted together with data or over a separate channel.

<A. Contents of Two-Level DCI>

Slow DCI Contents+Fast DCI Contents

When the DCI is transmitted using the two-level DCI, the first DCI may contain information to be applied during one subframe or multiple sTTIs/TTIs, and the second DCI may contain information to be applied during one sTTI linked to the position of an sTTI within which the second DCI is transmitted.

Default DCI Contents+Replaced DCI Contents

Alternatively, when DCI is transmitted using two-level DCI, the first DCI may contain default DCI content and the second DCI may contain replaced DCI content. For example, the UE may basically recognize the DCI contents of the first DCI as valid DCI content. When all or some of the DCI fields are newly received by the second DCI, however, the UE may replace the DCI contents corresponding to the DCI fields received through the second DCI, among the DCI contents obtained through the first DCI, with the DCI contents obtained through the second DCI.

First DCI for Multiple UEs

DCI format 3 is used for the transmission of TPC commands for PUCCH and PUSCH with 2-bit power adjustments. The following information is transmitted by means of the DCI format 3: TPC command number 1, TPC command number 2, . . . , TPC command number N, where N=floor ($L_{format0}/2$) and where $L_{format0}$ is equal to the payload size of DCI format 0 before CRC attachment when DCI format 0 is mapped onto the common search space, including any padding bits appended to DCI format 0. The parameter tpc-Index provided by higher layers determines the index to the TPC command for a given UE. If floor($L_{format0}/2$) <$L_{format0}/2$, a bit of value zero shall be appended to DCI format 3. DCI format 3A is used for the transmission of TPC commands for PUCCH and PUSCH with single bit power adjustments. The following information is transmitted by means of the DCI format 3: TPC command number 1, TPC command number 2, . . . , TPC command number M, where M=$L_{format0}$ and where $L_{format0}$ is equal to the payload size of DCI format 0 before CRC attachment when DCI format 0 is mapped onto the common search space, including any padding bits appended to DCI format 0. The parameter tpc-Index provided by higher layers determines the index to the TPC command for a given UE. As described above, DCI format 3/3A contains TPC commands for multiple UEs.

When DCI is transmitted using two-level DCI, the first DCI may contain DCI information for multiple UEs in one DCI, similar to DCI format 3/3A. For example, the first DCI sPDCCH transmission PRB/resource information, sPDSCH/sPUSCH resource allocation information, the number of layers (antenna ports), MCS and/or modulation order, and the like of each UE may be transmitted through the first DCI for multiple UEs. Then, in addition to the information contained in the first DCI, information necessary for transmission of the sPDSCH/sPUSCH may be UE-specifically transmitted via the second DCI.

Alternatively, the first DCI and the second DCI may schedule one PDSCH twice. In other words, the same data or same transport block may be transmitted twice, once through the PDSCH according to the first DCI and once through the PDSCH according to the second DCI. For example, PDSCH transmission may be scheduled by the first DCI through simple transmission diversity such as transmission mode (TM) 1 or TM 2, and PDSCH transmission by beam forming for the same data (which may have different redundancy versions) may be scheduled by the second DCI. Thereby, the diversity gain may be achieved. Specifically, the first DCI may increase the reliability by reducing the size to include only simple information for basic scheduling, and the second DCI may be considered to optimize the data. For example, when the first DCI and the second DCI schedule two PDSCHs for the same data, the first DCI may reduce the size thereof to improve reliability since it schedules a PDSCH which uses transmission diversity. The second DCI may optimize PDSCH transmission for the channel condition of the UE although the size of the second DCI is increased as the second DCI schedules a PDSCH transmitted through beamforming.

Alternatively, the first DCI may be used only for the purpose of indicating that there is scheduling information for the UE, and the scheduling information may be provided to the UE through the second DCI. In this case, if the UE receives the first DCI but does not receive the second DCI, it may request execution of fast retransmission by transmitting a fast NACK to the network. That is, if the UE receives the first DCI but does not receive the second DCI, the UE may immediately transmit a NACK without waiting for PDSCH reception timing or attempting PDSCH decoding.

If the size of the first DCI is smaller than the size of the general or legacy DCI, the first DCI may be transmitted in the form of a channel/signal having a robustly designed code rate, such as an existing control channel or another A/N channel.

Alternatively, information for decoding the second DCI may be transmitted/received via the first DCI. For example, if the second DCI is non-orthogonally multiplexed through scrambling or the like, the first DCI may contain information about the scrambling pattern of the second DCI and the code applied to the second DCI. This may correspond to sending a rule in the first DCI and applying the same to several groups of the second DCI.

Alternatively, the data transmission scheme may be determined through the first DCI. For example, the second DCI may contain the data instead of containing control information (e.g., scheduling information) about the PDSCH. The first DCI may include indication information about the data transmission scheme. For example, the first DCI may indicate whether data will be transmitted on the sPDCCH or on an sPDSCH scheduled by the sPDCCH. In addition, the first DCI may contain the sPDCCH monitoring configuration information including the resource/transmission scheme information of the second DCI to allow the UE to monitor an sPDCCH carrying the second DCI. The sPDCCH monitoring configuration information may be sPDCCH search space configuration information. The sPDCCH search space configuration information may include, for example, a PRB set which may have an sPDCCH, an sPDCCH type (e.g., localized type or distributed type), and a restriction on an aggregation level. This approach may be considered when the data size is small, multiple data are transmitted at the same time and multiplexing of resources for transmission of the multiple data is required. In particular, this approach may be useful in transmission of Internet of Things (IoT) data with a small data size.

The network or eNB provides basic scheduling information through the first DCI, and may then use the second DCI when scheduling several transport blocks or intends to provide additional information to the UE. Therefore, the UE may perform the basic operation upon receiving the first DCI, and may apply the advanced feature to the transmission or reception of the data upon receiving the second DCI.

Alternatively, two DCIs may not be transmitted. Instead, one DCI may be sent on two downlink control channels (e.g., (s)PDCCHs). For example, one DCI to be transmitted may be mapped to one PDCCH resource and one sPDSCH resource. This is intended to prevent CRC overhead from increasing as in the case when CRC is added to each DCI as the DCI to be transmitted separated into two DCIs. However, this requires the DCI contents to be predetermined at the time when the PDCCH is transmitted, which is disadvantageous. In order to overcome this issue, DCI contents or DCI fields (hereinafter, DCI contents/fields) that do not vary with sTTI may be transmitted over the PDCCH, and DCI contents/fields that may vary with sTTI may be transmitted over the sPDCCH. In this case, in order to prevent the channel coded bits from varying depending on the DCI contents/fields that may vary with sTTI, channel coding or channel decoding may be independently performed for the DCI contents/fields that do not vary with sTTI and the DCI contents/fields that may vary with sTTI.

<B. Time to Apply DCI>

The First DCI may be transmitted in every subframe or once per specific time period.

In this case, the contents of the first DCI may be applied only within the subframe or period in which the first DCI is transmitted. In this case, if the UE fails to detect the first DCI, the UE may determine that transmission of the sPDSCH and/or sPUSCH over the sTTI within the corresponding subframe or period is invalid. Accordingly, if the UE fails to detect the first DCI, it may not attempt to detect the second DCI in the corresponding subframe or period.

Alternatively, the UE may determine that the first DCI that has been most recently detected is valid until it detects the next first DCI. In this case, even when the UE fails to detect the first DCI, it may detect the second DCI and perform reception/transmission of the sPDSCH/sPUSCH.

The transmission period and search space (SS) of the first DCI and the transmission period and SS of the second DCI may be separately configured. For example, it may be assumed that the first DCI is transmitted every 5 ms, and when it is assumed that the UE transmits an A/N for the first DCI, the time at which the first DCI is applied may be assumed to be after transmission of the A/N. For example, the A/N for the first DCI may be transmitted at TTI n and the UE and eNB may apply or assume to apply the first DCI at TTI n+4. The contents of the first DCI may be assumed to be valid for the next period, and the first DCI may be UE-group-specific, UE-specific, or carrier-specific. In addition, the search space in which the first DCI is transmitted may be configured separately from the search space of the existing DCI or the second DCI. For example, as the EPDCCH PRB-set is configured separately from the search space for the existing DCI, the PRB-set and the number of BDs, the period, and the like over which the search space for the first DCI spans may be separately configured. If the first DCI is not transmitted, the UE or eNB may assume that the previous first DCI is valid. Alternatively, if the default configuration for fallback is given, and the first DCI is not transmitted, the UE or eNB may operate according to the above default configuration. In particular, the UE or eNB may operate according to the default configuration for fallback in cases where reliability is required for UE operation when the first DCI is not received. In this case, the first DCI and the second DCI may contain duplicate content. If the first DCI and the second DCI contain duplicate content, the period of the first DCI may be the same as that of the second DCI, and the UE receiving the first DCI or second DCI may determine that the DCI has been successfully received.

<C. A/N Feedback for First DCI>

When two-level DCI is used, the UE should receive two PDCCHs to obtain the full DCI contents since the DCI is divided into two PDCCHs. DCI reception reliability may be lowered compared to a case where the UE needs to receive only one PDCCH because the UE should successfully receive both the PDCCH carrying the first DCI and the PDCCH carrying the second DCI. Therefore, the UE may feed back the A/N information about the received first DCI to have confidence in detection of the first DCI.

The A/N information about reception of the first DCI reception may be transmitted through a PUCCH resource linked to the first CCE resource on which the first DCI has been transmitted.

The A/N transmission scheme for the first DCI reception may be more suitable for a case where the first DCI is transmitted at a relatively long periodicity or aperiodically. If the first DCI is frequently transmitted, the A/N for the first DCI should be transmitted every time the first DCI is transmitted, it will require a lot of overhead or delay for the A/N feedback.

<D. Search Space/Candidates of First DCI>

When the first DCI is transmitted in the resource region in which the legacy PDCCH is transmitted, a search space or decoding candidate through which the first DCI may be transmitted needs to be defined.

In the present invention, it is proposed that the first DCI be transmitted using the following method.

The first DCI may be transmitted via the PDCCH UE-specific search space (USS) or the PDCCH common search space (CSS). In particular, in multicasting or broadcasting the first DCI to multiple UEs, it may be preferable to transmit the first DCI through the PDCCH CSS.

In this case, the following method may be used to enable the UE to distinguish the first DCI transmitted in the PDCCH transmission region from the legacy DCIs. Legacy DCI may be DCI transmitted at a single level such as a UL grant or an LTE legacy DCI transmitted on a legacy PDCCH. Legacy DCIs may include DCIs for single-cell point-to-multipoint (SC-PTM), multimedia broadcast/multicast service (MBMS), or transmit power control (TPC), which is transmitted on the common search space.

Option 1. Distinction of DCI Format

To distinguish between the legacy DCI and the first DCI, the first DCI may have a different DCI format and a different DCI size than the legacy DCI formats. In this case, the DCI size of the first DCI may be determined freely, although there is a disadvantage in that the number of blind detections of the UE increases.

Option 2. Distinction of Scrambling

To distinguish between the legacy DCI and the first DCI, different scrambling may be applied to the PDCCH on which the legacy DCIs are transmitted and the PDCCH on which the first DCI is transmitted.

1) The legacy DCIs and the first DCI may be scrambled using different RNTIs. For example, the UE may have two C-RNTIs. The UE may use one C-RNTI to monitor a DCI that schedules data to be transmitted based on a legacy TTI (e.g., 1 ms subframe), and use the other C-RNTI to monitor the first DCI. The two C-RNTIs may be configured independently of each other. Alternatively, one C-RNTI may be configured for the UE by the eNB, the legacy DCI may be scrambled using this C-RNTI, and the first DCI may be scrambled using C-RNTI'=C-RNTI+α. Distinguishing between the legacy DCI and the first DCI through scrambling may be appropriate when a first DCI, which is UE-specific, is transmitted. In the case where the first DCI may be transmitted in the legacy PDCCH region and the legacy DCI may also be transmitted, the size of the first DCI may be defined to be equal to DCI format 0/1A, for example, to reduce the number of times of blind detection of the UE.

2) Alternatively, there may be a separate RNTI for transmission/reception of the first DCI. The separate RNTI for the first DCI may be UE-specific, cell-specific, or group-specific. A PDCCH carrying the first DCI using the separate RNTI may be scrambled. In the case where the first DCI may be transmitted in the legacy PDCCH region and the legacy DCI may also be transmitted, the size of the first DCI may be defined to be equal to that of DCI format 0/1A, for example, to reduce the number of times of blind detection of the UE.

3) Additional scrambling may be applied to the first DCI compared to legacy DCIs. For example, when a DCI scheduling data transmitted in a legacy TTI is scrambled using scrambling sequence A, a DCI scheduling data transmitted in an sTTI may be scrambled using scrambling sequence A, and may be further scrambled using scrambling sequence B. If the first DCI and the legacy DCI may be transmitted in the legacy PDCCH region, the size of the first DCI may be defined to be equal to DCI format 0/1A, for example, to reduce the number of times of blind detection of the UE.

Option 3. Distinction of Decoding Candidates

Figure 11:
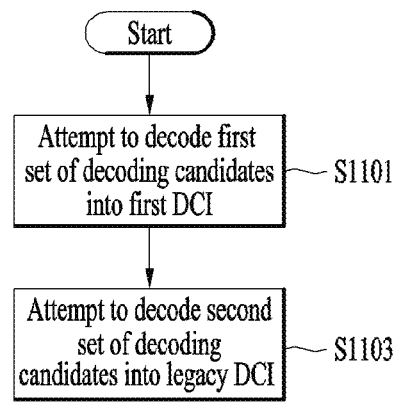
FIG. 11 illustrates a method for transmitting/receiving downlink control information according to an embodiment of the present invention.
Figure 12:
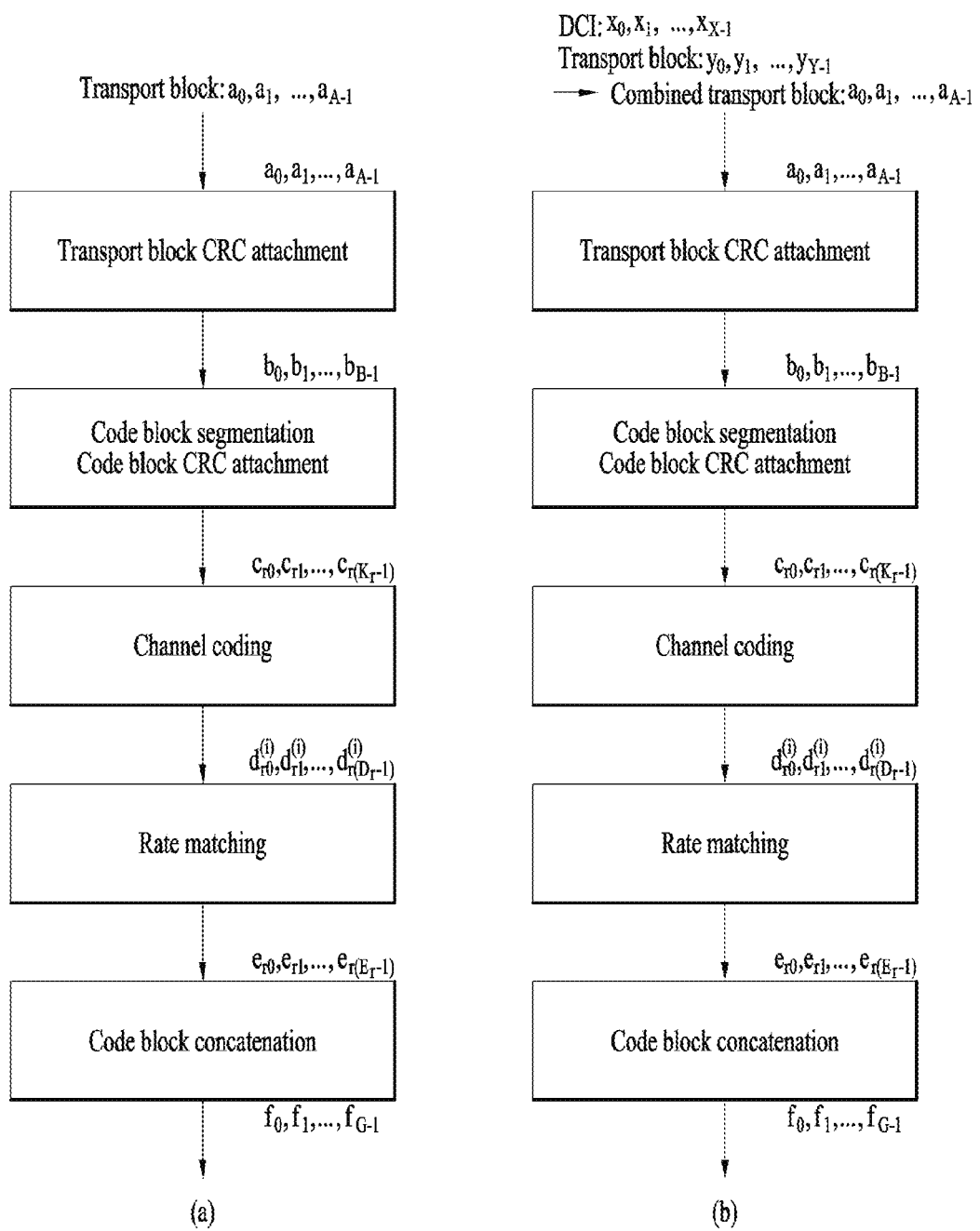
FIG. 12 to FIG. 15 illustrate a procedure of processing control information and transport blocks according to an embodiment of the present invention.

FIG. 11 illustrates a method for transmitting/receiving downlink control information according to an embodiment of the present invention.

To distinguish between legacy DCI and first DCI, the decoding candidates (i.e., PDCCH candidates) on which the legacy DCI and the first DCI may be transmitted may be distinguished from each other. There may be a decoding candidate set in which legacy DCI may be transmitted and a decoding candidate set in which the first DCI may be transmitted, and the two sets may not overlap each other.

For example, when there are N decoding candidates in the CSS or USS, the legacy DCI may be transmitted/received through decoding candidates 0 to 'N/2'-1, and the first DCI may be transmitted/received through decoding candidate N/2 to N-1. More specifically, when the number of decoding candidates for each aggregation level L is N_L, the legacy DCI may be transmitted/received through decoding candidates 0 to 'N_L/2'-1, and the first DCI may be transmitted/received through decoding candidates N_L/2 to 'N/2'-1. Alternatively, when there are N decoding candidates in the CSS or USS, the first DCI may be transmitted/received through decoding candidates 0 to 'N/2'-1, and the legacy DCI may be transmitted through decoding candidates N/2 to N-1. More specifically, when the number of decoding candidates for each aggregation level L is N_L, the fast DCI may be transmitted/received through decoding candidates 0 to 'N_L/2'-1, and the legacy DCI may be decoded transmitted/received through decoding candidates N_L/2 to 'N/2'-1.

Alternatively, the legacy DCI and the first DCI may be transmitted through decoding candidates of different aggregation levels. The legacy DCI may be transmitted via a decoding candidate with aggregation level 1 and/or aggregation level 2, and the first DCI may be transmitted through a decoding candidate with aggregation level 4 and/or aggregation level 8.

The decoding candidates through which the legacy DCI may be transmitted and the decoding candidates through which the first DCI may be transmitted may be defined in the communication standard document, or the eNB may semi-statically configure the candidates for the UE through the SIB/RRC or the like. Introduction of the two-level DCI is considered for transmission/reception of delay-sensitive signals. Thus, in order to receive the first DCI more quickly, the UE may attempt to perform decoding of the decoding candidates that may be used for transmission of the first DCI prior to decoding of the decoding candidates that may be used for transmission of the legacy DCI. Referring to FIG. 11, in order to receive first DCI, the UE may only attempt to perform decoding on a first set of decoding candidates from among a plurality of decoding candidates constituting a search space (S1101), and may not attempt to decode the first DCI for a second set of decoding candidates, which correspond to the remaining decoding candidates of the search space. However, the UE may attempt to decode the legacy DCI in the second set of decoding candidates (S1102).

The following options may be additionally considered for distinguishing between first DCI that is not present in the legacy PDCCH region, first DCI in the new RAT, two-step or multi-step DCI, and single level DCI.

Option 4. Separate Control Subband Configuration (or PRB/Time Set Configuration)

Physical resources for transmission/reception of different DCIs may be distinguishably configured according to time and/or frequency.

Option 5: Separate Control Monitoring Occasion Configuration (e.g., Subset of Slots)

Physical resources for transmission/reception of different DCIs may be configured to be monitored in different slots or the like.

Meanwhile, whether to transmit DCI in the form of two level DCI or single level DCI may depend on a data transmission scheme or situation, or a usage scenario. For example, one of the following methods may be used to determine whether to transmit DCI for scheduling data in the form of two level DCI or single level DCI.

Method 1. The transmission format of the DCI may be changed according to the transmission mode of the data or the transmission scheme. For example, single level DCI may be used when data transmission uses a transmission diversity-based transmission scheme/mode, and two level DCI may be used when data transmission uses a beamforming-based transmission scheme/mode.

Method 2. The transmission format of the DCI may be changed through explicit signaling from the eNB. For example, whether to transmit DCI for scheduling data in the form of two-level DCI or single-level DCI may be configured through RRC signaling.

Method 3. The transmission format of the DCI may be changed according to the type of data received by the UE. For example, if the UE knows the type of data it should receive (e.g., enhanced mobile broadband (eMBB) data or URLLC data) or the importance of latency (e.g., low importance or high importance), the UE may receive DCI in the form of two level DCI in receiving eMBB data or data for which latency is less important, and receive DCI in the form of single level DCI in receiving URLLC data or data for which latency is important. Alternatively, the UE may receive DCI when eMBB data or latency receive less important data, single level DCI, URLLC data, or latency may receive DCI using two level DCI when receiving important data.

Method 4. The transmission format of the DCI may be changed according to the numerology (e.g., OFDM symbol length, subcarrier spacing, and/or data TTI size) with which the UE receives a control channel and/or data channel. For example, a single level DCI may be used when control and/or data is transmitted/received with a short TTI size, and a two level DCI may be used when control and/or data is transmitted/received with a long TTI size. Alternatively, the two level DCI may be used when control information and/or data is transmitted/received in a short TTI size, and the single level DCI may be used when control information and/or data is transmitted/received in a long TTI size.

Method 5. The transmission format of the DCI may be changed according to the OFDM symbol index in which the DCI is transmitted. For example, the DCI transmitted in OFDM symbol #x may be transmitted as single level DCI, and the DCI transmitted in OFDM symbol #y may be transmitted as two level DCI. The DCI transmitted in OFDM symbol #y becomes the first DCI of the two level DCI, and the second DCI may be transmitted thereafter.

Method 6. The transmission format of DCI may be changed according to whether the transmission of data is initial transmission or retransmission. For example, the DCI that schedules data to be subjected to initial transmission may be transmitted as single level DCI, and the DCI that schedules data to be subjected to retransmission may be transmitted as two level DCI. In this case, the UE may determine whether the received data is initially transmitted data or retransmitted data through blind decoding for the DCI transmission format. In this case, the new data indicator (NDI) field of the DCI fields may be excluded from the DCI.

<E. Two-Level DCI for Downlink Grant and Uplink Grant>

Separated First DCI for Downlink Grant and Uplink Grant

The two-level DCI may be used for both downlink data scheduling and uplink data scheduling. In this case, the UE may need to receive two first DCIs.

One first DCI may contain downlink data scheduling information (i.e., a downlink grant) and the other first DCI may contain uplink data scheduling information (i.e., an uplink grant).

Alternatively, one first DCI may contain information about the sPDCCH transmission resources (e.g., the PRB-set through which the sPDCCH may be transmitted) and technique through which the DCI for performing the downlink data scheduling is transmitted, and the other first DCI may contain information about the sPDCCH transmission resources and technique through which the DCI for performing the uplink data scheduling is transmitted.

Unified First DCI for Downlink Grant and Uplink Grant

The two-level DCI may be used for both downlink data scheduling and uplink data scheduling, but the UE may receive one first DCI.

In this case, the first DCI may contain downlink data scheduling information and/or uplink data scheduling information. In this case, the first DCI size may vary depending on whether the first DCI contains downlink grant information, uplink grant information, or both downlink grant information and uplink grant information. Accordingly, the number of BDs of the UE may increase, which is disadvantageous.

Alternatively, one first DCI may contain common information for downlink data scheduling and uplink data scheduling. For example, if the resource allocation information for transmission of downlink data is identical to the resource allocation information for transmission of uplink data, the resource allocation information of the downlink data and the uplink data may be transmitted through the first DCI.

Alternatively, one first DCI received by the UE may contain information about the sPDCCH transmission resources (e.g., the PRB-set through which the sPDCCH may be transmitted) and the technique through which the DCI for performing downlink/uplink data scheduling is transmitted. In this case, the sPDCCHs on which the downlink grant and the uplink grant are transmitted may have the same transmission resource and technique. Alternatively, one first DCI received by the UE may contain information about an sPDCCH transmission resource (e.g., a PRB-set in which an sPDCCH may be transmitted) and technique for carrying the DCI for downlink data scheduling and an sPDCCH transmission resource and technique through which the DCI for uplink data scheduling is transmitted.

Alternatively, resource allocation for the PDSCH may be provided by the first DCI, and second DCI may be embedded in the resource of the corresponding PDSCH and transmitted. In this case, if the first DCI is the first UL grant, the PDSCH resource may be used only to indicate the area of the second DCI. In other words, if the first DCI is an UL grant, the PDSCH resource information in the first DCI may be used only to indicate the resource for the second DCI, not the actual PDSCH transmission. In this case, the second DCI may contain information corresponding to the actual UL grant. More specifically, the second DCI may contain both downlink scheduling (i.e., DL grant) and UL grant. That is, data may be transmitted in the PDSCH region. Additionally, the second DCI may include UL grant information, and the PUSCH resource allocation information may be included in the UL grant.

First DCI for Downlink Grant Only

Considering a situation where the size of a downlink grant is larger than the size of an uplink grant, the two-level DCI may be defined to be used only for downlink data scheduling. That is, for uplink data scheduling, uplink data scheduling may be performed through one DCI without transmitting a two-level DCI. In this case, the UE may receive one first DCI.

<F. RS Sharing of Second DCI and PDSCH>

The two-level DCI may be applied not only in LTE/LTE-A but also in the new RAT environment. The first DCI and the second DCI may be transmitted over independent channels. The invention proposed in Sections A to E may be applied to the two-level DCI applied in the new RAT, the first DCI and the second DCI which are transmitted on the independent channels and the second DCI.

The first DCI is transmitted through a channel called PDCCH_X, while the second DCI may be transmitted through a channel called PDCCH_Y. In this case, PDCCH_Y may be demodulated using the same RS (e.g., DMRS) as the PDSCH scheduled by the second DCI. In addition, the antenna port may be shared between transmission of PDCCH_Y and transmission of the PDSCH. When it is assumed that there is a DMRS for a total of N antenna ports with antenna port index $p_0, p_1, \ldots, p_{N-1}$, PDCCH_Y and PDSCH may be transmitted using the entirety or some of antenna ports $p_0, p_1, \ldots, p_{N-1}$. Hereinafter, an antenna port used for both PDCCH_Y transmission and PDSCH transmission among antenna port $p_0, p_1, \ldots, p_{N-1}$ is called an antenna port shared by PDCCH_Y transmission and PDSCH transmission.

When the Number of PDCCH_Y Antenna Ports is Fixed

PDCCH_Y may be transmitted using a fixed number of antenna ports. For example, similar to the case of the legacy EPDCCH, localized transmission may be performed through one antenna port, and distributed transmission may be performed through two antenna ports. On the other hand, the PDSCH may be transmitted in multiple layers through L (L≤N) antenna ports. In this case, the value of L may depend on the channel environment.

In this case, PDCCH_Y and PDSCH may be transmitted through fixed antenna port(s) according to one of the following options.

Option 1. Fixed Antenna Port Index for PDCCH_Y

A PDSCH to be transmitted through L antenna ports may be transmitted through antenna ports $p_0$ to $p_{L-1}$. In this case, PDCCH_Y may be transmitted through fixed antenna port(s).

At this time, the DMRS overhead may be reduced by sharing as many of the antenna ports for the PDCCH_Y and the antenna ports for the PDSCH as possible. To reduce the DMRS overhead, the PDCCH_Y antenna port may correspond to the lowest antenna port index (e.g., $p_0$) of $p_0$ to $p_{N-1}$.

If the number of antenna ports for PDCCH_Y is different from the number of antenna ports for PDSCH and some antenna ports are shared, optimal precoding may not be applied to both PDCCH_Y and PDSCH. If the number of antenna ports is different, the size of the precoding matrix is different, and thus the precoding matrices applied to PDCCH_Y and PDSCH are different from each other. That is, a precoding matrix optimal for PDCCH_Y may not be optimal for the PDSCH, and a precoding matrix optimal for the PDCCH_Y may not be optimal for the PDSCH. Therefore, if the number of antenna ports for transmitting PDCCH_Y and the number of antenna ports for transmitting PDSCH are different from each other and the PDCCH_Y and the PDSCH share some antenna port(s), the precoding gain may be reduced. To address this issue, the PDCCH_Y antenna port may be defined to be equal to the largest antenna port index (e.g., $p_{N-1}$) among $p_0$ to $p_{N-1}$, such that the antenna ports for PDCCH_Y are separated from as the antenna ports for the PDSCH as much as possible.

Option 2. Antenna Port Diversity for PDCCH_Y

The PDSCH to be transmitted through L antenna ports may be transmitted through antenna ports $p_0$ to $p_{L-1}$. At this time, PDCCH_Y may be transmitted through fixed antenna port(s).

In this case, the precoding matrix may be determined according to the number of antenna ports for the PDSCH and the channel environment. In this case, unlike the conventional distributed EPDCCH, it may be difficult to obtain the precoding diversity gains by applying a random precoding matrix for each PRB. Therefore, PDCCH_Y may be transmitted using different antenna ports according to PRB and/or subframe to obtain antenna port diversity. The PDCCH_Y transmission antenna port index(es) may be determined according to the PRB index and/or subframe index. For example, if α=('PRB index' mod N), PDCCH_Y may be transmitted through antenna port $p_\alpha$ in a specific PRB.

When the DMRS is included in the transmission region of PDCCH_Y, the PDCCH_Y may be rate-matched and transmitted in the RE (hereinafter, referred to as the DMRS RE) in which the DMRS is transmitted. Therefore, the position of the RE in which PDCCH_Y is transmitted may depend on the number and/or indexes of the antenna ports for the PDSCH. In this case, if the UE does not know the number and/or indexes of the antenna ports applied to the PDSCH, the UE may not clearly recognize the PDCCH_Y transmission resource region. To address this issue, the following methods may be used.

Method 1. Assuming Maximum DMRS Ports and Rate-Matching

For rate-matching of PDCCH_Y, a maximum number of DMRS antenna ports may be assumed. That is, PDCCH_Y may be rate-matched in the DMRS RE(s) on the assumption of the maximum number of antenna ports.

Method 2. PDCCH_Y DMRS Port: Rate-Matching, DMRS for PDCCH_Y Punctures PDCCH_Y

For rate-matching of PDCCH_Y, only the DMRS of the antenna port through which PDCCH_Y is transmitted may be assumed. In this case, if the PDCCH_Y conflicts with PDSCH DMRS REs, the DMRS of the antenna port only for transmission of the PDSCH may be transmitted by puncturing the PDCCH_Y.

Alternatively, PDCCH_Y may be mapped to resources without considering DMRS transmission resources. In this case, if DMRS RE(s) for PDCCH_Y and PDSCH conflict with the PDCCH_Y resources, the DMRS may be transmitted by puncturing PDCCH_Y.

If the UE knows an antenna port for PDCCH_Y and/or PDSCH transmission, the UE assumes that PDCCH_Y is punctured in the DMRS RE (s) of the corresponding antenna port.

Method 3. Blind Decoding/Detection (BD)

The UE may assume that PDCCH_Y has been rate-matched and transmitted in the DMRS RE(s) for PDCCH_Y and PDSCH. In this case, the UE may receive PDCCH_Y through blind decoding by attempting to perform PDCCH_Y decoding by varying the PDCCH_Y resource mapping according to the number of antenna ports and/or indexes available for transmission of the PDSCH. In addition, the UE may detect the number and/or indexes of the antenna ports applied to the PDSCH without an indication by DCI.

Method 4. RRC or Legacy PDCCH Indication

The number and/or indexes of antenna ports for rate-matching of PDCCH_Y may be configured for a UE by an eNB through RRC or legacy PDCCH, or first DCI. This configuration may be the same as the number of antenna ports and/or indexes of antenna ports, applied to the actual PDSCH transmission. In this case, the number of the PDSCH transmission antenna ports and/or indexes of the PDSCH transmission antenna ports need not be separately configured for the UE through PDCCH_Y. Alternatively, separately from the configuration of the number and/or indexes of antenna ports for rate-matching of PDCCH_Y resources, the number and/or indexes of antenna ports applied to actual PDSCH transmission may be configured through DCI carried by PDCCH_Y.

Method 5. DMRS Pattern

In order to prevent change in the number of antenna ports for the PDSCH from affecting the rate-matching of the PDCCH_Y resources, the DMRS for the antenna ports used for the PDCCH_Y transmission is present in the PDCCH_Y transmission region (e.g., PRB(s) having the PDCCH_Y and/or OFDM symbols having the PDCCH_Y), and the DMRS for the remaining antenna ports may be present in a region (e.g., PRB(s) without PDCCH_Y and/or OFDM symbol(s) without PDCCH_Y) out of the PDCCH_Y transmission region. For example, the DMRS for antenna port $p_0$ may be transmitted in a region of OFDM symbol(s) used for transmission of PDCCH_Y and the DMRS for the remaining antenna port(s) is transmitted in a region of OFDM symbol(s) not used for transmission of PDCCH_Y. Alternatively, if the transmission resource position of the DMRS for antenna port $p_0$ is the same as the transmission resource position of the DMRS for antenna port $p_1$ and the DMRS for antenna port $p_0$ and the DMRS for antenna port $p_1$ are transmitted through code division multiplexing (CDM), the DMRS for antenna port $p_0$ and the DMRS for antenna port $p_1$ may be transmitted in a region of OFDM symbol(s) used for transmission of PDCCH_Y, i.e., in the OFDM symbol(s) with the PDCCH_Y, and the DMRS for the remaining antenna port(s) may be transmitted within a region of OFDM symbol(s) not used for transmission of PDCCH_Y, i.e., the OFDM symbol(s) without the PDCCH_Y.

When the Number of PDCCH_Y Antenna Ports is Equal to the Number of Antenna Ports of PDSCH If the number of antenna ports for PDCCH_Y is different from the number of antenna ports for PDSCH and some antenna ports are shared, optimal precoding may not be applied to both PDCCH_Y and PDSCH. Therefore, it may be defined that the number and positions of antenna ports for transmitting PDCCH_Y and the number and positions of antenna ports for transmitting PDSCH are the same (at least within the same sTTI).

In this case, the number of PDCCH_Y antenna ports may be determined according to the number of layers (L) of the PDSCH. That is, PDSCH and PDCCH_Y may be transmitted through the same number (L≤N) of the same antenna ports. For example, PDSCH and PDCCH_Y may be transmitted through antenna ports $p_0, p_1, \ldots, p_{L-1}$. In this case, in order to transmit PDCCH_Y in multiple layers, PDCCH_Y may be mapped to antenna ports as follows.

Option 1. The same PDCCH_Y data may be transmitted through all antenna ports. For example, in the case where PDCCH_Y is transmitted through 2 antenna ports, when a precoding matrix applied to a specific RE is $$P = \begin{bmatrix} p_{0,0} & p_{0,1} \\ p_{1,0} & p_{1,1} \end{bmatrix},$$

and the data symbol transmitted through each antenna port is $$X = \begin{bmatrix} x_0 \\ x_1 \end{bmatrix},$$

the same symbol (=s) may be transmitted as $x_0$ and $x_1$ in an RE used for transmission of PDCCH_Y. Therefore, the values transmitted through the two antenna ports may be $$P \times X = \begin{bmatrix} p_{0,0} & p_{0,1} \\ p_{1,0} & p_{1,1} \end{bmatrix}\begin{bmatrix} x_0 \\ x_1 \end{bmatrix} = \begin{bmatrix} p_{0,0} & p_{0,1} \\ p_{1,0} & p_{1,1} \end{bmatrix}\begin{bmatrix} s \\ s \end{bmatrix} = \begin{bmatrix} p_{0,0} + p_{0,1} \\ p_{1,0} + p_{1,1} \end{bmatrix}s.$$

Option 2. One PDCCH_Y codeword may be divided and transmitted through multiple antenna ports in order for PDCCH_Y to be transmitted in multiple layers. For example, in the case where PDCCH_Y is transmitted with 2 antenna ports, when a precoding matrix applied to a specific RE is $$P = \begin{bmatrix} p_{0,0} & p_{0,1} \\ p_{1,0} & p_{1,1} \end{bmatrix},$$

the data symbol transmitted through each antenna port is $$X = \begin{bmatrix} x_0 \\ x_1 \end{bmatrix},$$

$s_{2i}$ and $s_{2i+1}$ may be transmitted as $x_0$ and $x_1$, respectively, in the i-th RE which is used for transmission of PDCCH_Y. Therefore, the values transmitted through the two antenna ports may be $$P \times X = \begin{bmatrix} p_{0,0} & p_{0,1} \\ p_{1,0} & p_{1,1} \end{bmatrix}\begin{bmatrix} x_0 \\ x_1 \end{bmatrix} = \begin{bmatrix} p_{0,0} & p_{0,1} \\ p_{1,0} & p_{1,1} \end{bmatrix}\begin{bmatrix} s_{2i} \\ s_{2i+1} \end{bmatrix} = \begin{bmatrix} p_{0,0}s_{2i} + p_{0,1}s_{2i+1} \\ p_{1,0}s_{2i} + p_{1,1}s_{2i+1} \end{bmatrix}.$$

In this case, the UE needs to know information about the number and/or positions of the antenna ports through which PDCCH_Y is transmitted. This is because the RE used for transmission of PDCCH_Y may be changed according to the number and/or indexes of antenna ports of PDCCH_Y, and channel estimation and the transmission scheme may change. The following methods may be used to allow the UE to recognize the number and indexes of antenna ports used for transmission of PDCCH_Y.

Method 1. Blind Decoding/Detection (BD)

The UE may attempt to perform PDCCH_Y decoding by changing the PDCCH_Y resource mapping, channel estimation, and/or transmission scheme according to the number and/or index(es) of antenna ports available for transmission of the PDCCH_Y to receive PDCCH_Y through blind decoding. The UE may detect the number and/or index(es) of the antenna ports applied to the PDSCH through such blind decoding without explicit indication by the DCI.

The UE may happen to succeed in decoding PDCCH_Y using a wrong number of antenna ports and/or antenna port indexes. In this case, ambiguity may occur due to mismatch between the PDCCH_Y antenna port(s) determined by the UE and the antenna port(s) actually used for transmission of PDCCH_Y. To address this issue, information about the number and/or index(es) of the antenna ports used for transmission of the PDCCH_Y (and PDSCH) may be provided to the UE through the DCI (hereinafter, referred to as PDCCH_Y DCI) carried by PDCCH_Y. That is, the antenna port(s) for PDCCH_Y/PDSCH may be configured for the UE via the DCI that the PDCCH_Y carries.

Method 2. RRC or Legacy First DCI Indication

The eNB may configure the number and/or index(es) of antenna ports for rate-matching of PDCCH_Y for the UE through RRC or first DCI.

The Number of PDCCH_Y Antenna Ports and the Number of PDSCH Antenna Ports are Applied Independently The number of antenna ports of PDCCH_Y and the number of antenna ports of PDSCH may be set independently of each other, while the number of antenna ports of PDCCH_Y is not fixed. In this case, the UE needs to know information on the number and/or locations of antenna ports (hereinafter, PDCCH_Y antenna ports) used for transmission of PDCCH_Y and/or information on the number and/or locations of antenna ports (hereinafter, PDSCH antenna port) used for transmission of PDSCH. The RE of the PDCCH_Y, channel estimation, and transmission scheme may be changed according to the number and/or index(es) of the PDCCH_Y antenna ports, and/or the number and/or index(es) of the PDSCH antenna ports. The following methods may be used to allow the UE to recognize the number of PDCCH_Y/PDSCH antenna ports and/or the PDCCH_Y/PDSCH antenna port indexes.

Method 1. Blind Decoding/Detection (BD)

The UE may attempt to perform PDCCH_Y decoding by changing the PDCCH_Y resource mapping, channel estimation, and/or transmission scheme according to the number and/or index(es) of antenna ports available for transmission of PDCCH_Y, and/or the number and/or index(es) of antenna ports available for transmission of PDSCH to receive PDCCH_Y through blind decoding. The UE may detect the number and/or index(es) of the antenna ports applied to the PDSCH through such blind decoding without explicit indication by the DCI.

It may happen that the UE succeeds in decoding PDCCH_Y using an incorrect number of antenna ports and/or antenna port indexes. In this case, ambiguity may occur due to mismatch between the PDCCH_Y antenna port(s) determined by the UE and the antenna port(s) actually used for transmission of PDCCH_Y. To address this issue, the number and/or index(es) of PDCCH_Y antenna ports and/or the number and/or index(es) of PDSCH antenna ports may be configured for the UE through PDCCH_Y DCI.

Method 2. RRC or Legacy PDCCH Indication

The eNB may configure the number and/or index(es) of antenna ports for rate-matching of the sPDCCH and/or sPDSCH for the UE through RRC or first DCI.

Depending on the aggregation level of PDCCH_X carrying the first DCI, the transmission resource and transmission scheme of the second DCI may be changed. In the present invention, the following factors may be determined according to the aggregation level of PDCCH_X carrying first DCI.

The aggregation level of PDCCH_Y may be determined or an aggregation level set of PDCCH_Y that the UE should monitor may be determined. Here, the aggregation level may mean the code rate, the amount of resources used to transmit PDCCH_Y, or the number of bits of the second DCI after rate-matching.

The modulation order used for transmission of PDCCH_Y may be determined.

<G. Second DCI in PDSCH>

Two-level DCI may be applied not only in LTE/LTE-A but also in the new RAT environment. The first DCI and the second DCI may be transmitted over independent channels. The invention proposed in Sections A to F are applicable not only to the two-level DCI applied in the new RAT, but also to the first DCI and second DCI transmitted over the independent channels.

Meanwhile, in this section, a method of transmitting the second DCI over the PDSCH while transmitting the first DCI over the PDCCH is proposed. The second DCI may be transmitted along with downlink data through the PDSCH scheduled by the first DCI. That is, the data (e.g., transport block) that the eNB intends to transmit may be transmitted together with the second DCI over the PDSCH. In this case, the following transmission methods may be considered in detail. Hereinafter, methods of transmitting the second DCI through a PDSCH are proposed. However, even when typical DCI other than the second DCI is transmitted through the PDSCH, the present invention proposed below may be applied.

FIG. 12 to FIG. 15 illustrate a procedure of processing control information and transport blocks according to an embodiment of the present invention.

Method 1

The eNB may combine the second DCI and a data transport block to be transmitted to generate a combined transport block. Then, the eNB may treat the combined transport block like an existing transport block, and perform a subsequent transmission process. For example, the eNB may apply the CRC attachment, code block segmentation and code block CRC attachment, channel coding, rate matching, and code block concatenation, which are applied to the existing transport blocks, to the combined transport block. FIG. 12(a) illustrates an existing transport channel processing procedure. The existing transport block may be processed according to the procedure of FIG. 12(a). As shown in FIG. 12(b), the transport channel processing procedure may be performed on the combined transport block, which is a combination of the second DCI and the transport block. In FIG. 12(a), transport blocks $a_0, a_1, \ldots, a_{A-1}$ having bit size A undergo the transport processing procedure. In FIG. 12(b), on the other hand, the combined transport blocks $a_0, a_1, \ldots, a_{A-1}$ with bit size A=X+Y obtained by combining the second DCI $x_0, x_1, \ldots, x_{X-1}$ having bit size X with transport blocks $y_0, y_1, \ldots, y_{Y-1}$ having bit size Y undergo the transport processing procedure.

Herein, the combined transport blocks may be generated from the second DCI and the transport blocks through the following procedure.

Second DCI $x_0, x_1, \ldots, x_{X-1}$ and transport block $y_0, y_1, \ldots, y_{Y-1}$ may be combined in order of the DCI and transport block to generate combined transport blocks $a_0, a_1, \ldots, a_{A-1} = x_0, x_1, \ldots, x_{X-1}, y_0, y_1, \ldots, y_{Y-1}$. In other words, in the combined transport block, the second DCI is located in the bits before the transport block. In this case, when the combined transport block is mapped to PDSCH resources according to the frequency first resource mapping rule, the second DCI is mapped to the OFDM symbol(s) in the front part of the OFDM symbols allocated to the PDSCH in the time domain, and accordingly the UE may receive the DCI prior to data.

When this technique is used, the same transmission scheme, antenna port number and location, and modulation order may be applied to the second DCI and the transport block. In addition, the second DCI and the transport block are given the same code rate through the same channel coding technique. In this case, the following information may be fixed or configured through the first DCI or RRC to allow the UE to receive the second DCI and transport block:

Resource allocation (PRBs for PDSCH transmission);
MCS index (or TB size, code rate, and/or modulation order);
Transmission mode;
Number of layers (or number of antenna ports) and/or antenna port index; and/or
Precoding matrix related information.

Method 2

Figure 13:
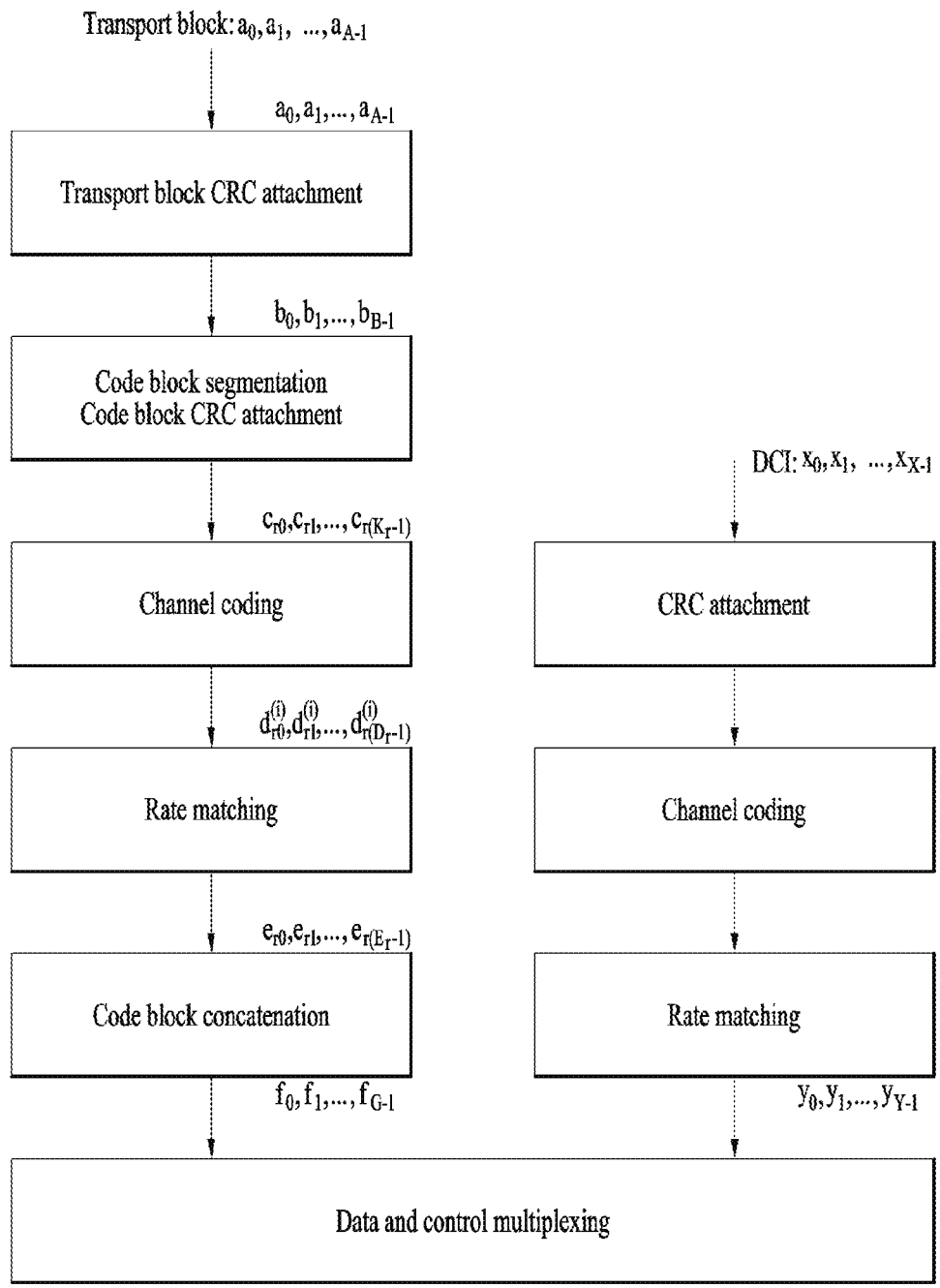

The existing transport channel processing procedure (e.g., CRC attachment, code block segmentation and code block CRC attachment, channel coding, rate matching, and code block concatenation) may be performed on the data transport block to be transmitted by the eNB. For the second DCI, data (e.g., transport block) and control information (e.g., second DCI) may be multiplexed after separate processing (e.g., CRC attachment, channel coding and/or rate-matching) is performed. For example, as shown in FIG. 13, the eNB may obtain $f_0, f_1, \ldots, f_{G-1}$ by performing the existing transport channel processing procedure on the transport blocks $a_0, a_1, \ldots, a_{A-1}$, and obtain $y_0, y_1, \ldots, y_{Y-1}$ by performing a separate processing procedure (e.g., CRC attachment, channel coding and/or rate matching) on DCI $x_0, x_1, \ldots, x_{X-1}$. The eNB may multiplex/combine '$f_0, f_1, \ldots, f_{F-1}$' C with '$y_0, y_1, \ldots, y_{Y-1}$' to obtain $g_0, g_1, \ldots, g_{H-1}$. This method may mean that the transport block (PDSCH) is rate-matched in the second DCI transmission resource for transmission of the second DCI.

Herein, $g_0, g_1, \ldots, g_{H-1}$ may be generated through multiplexing of the data and control information in the following procedure.

The second DCI $y_0, y_1, \ldots, y_{Y-1}$ and transport block $f_0, f_1, \ldots, f_{G-1}$ having undergone separate processing procedures may be combined in order of the DCI and transport block to generate $f_0, f_1, \ldots, f_{G-1} = y_0, y_1, \ldots, y_{Y-1}, f_0, f_1, \ldots, f_{G-1}$. Therefore, in the multiplexed sequence $g_0, g_1, \ldots, g_{X-1}$, the second DCI is located in the bits before the transport block. In this case, when the multiplexed sequence $g_0, g_1, \ldots, g_{X-1}$ is mapped to the PDSCH resource according to the frequency first resource mapping rule, the second DCI is mapped to the OFDM symbol(s) in the front part of the OFDM symbols allocated to the PDSCH in the time domain, and thus the UE may receive the DCI prior to data.

When this technique is used, the same transmission scheme, antenna port number and location, and modulation order may be applied to the second DCI and the transport block. In addition, the same code rate may be applied to the second DCI and the transport block through the same channel coding technique. In this case, the following information may be fixed or configured through the first DCI or RRC to allow the UE to receive the second DCI and transport block:

MCS index (or TB size, code rate, and/or modulation order);
Transmission mode;
Number of layers (or number of antenna ports) and/or antenna port index; and/or
Resource allocation (PRBs for PDSCH transmission).

Meanwhile, the same transmission scheme, antenna port number and location, and/or modulation order, or a separate channel coding and/or code rate may be applied to the second DCI and the transport block. In this case, the following information may be fixed or configured through the first DCI or RRC as common information to allow the UE to receive the second DCI and data (transport block):

Resource allocation (PRBs for PDSCH transmission);
Transmission mode;
Number of layers (or number of antenna ports) and/or antenna port index; and/or
Precoding matrix related information.

Meanwhile, the following information may be fixed or configured through the first DCI or RRC to allow the UE to receive the second DCI.

Aggregation level (code rate or bit size after rate matching): Depending on the aggregation level of the PDCCH carrying the first DCI, the aggregation level of the second DCI may be determined, or the aggregation level set of the PDCCH_Y that the UE should monitor may be determined. Here, the aggregation level may mean the code rate, the amount of resources used for transmission of PDCCH_Y, or the number of bits of the second DCI after rate-matching.

Channel coding: Channel coding may be fixed to a specific channel coding technique.

In order to allow the UE to receive data (transport block), the following information may be fixed or configured through the first DCI, second DCI, or RRC.

MCS index (or transport block size, code rate, and/or modulation order) for PDSCH.

Channel coding: Channel coding may be fixed to a specific channel coding technique.

The aggregation level (code rate, or bit size after rate matching) of the second DCI may not be fixed or configured with one specific value. Instead, the UE may perform blind decoding on a plurality of aggregation levels. In this case, depending on the aggregation level of the second DCI, the locations and/or amount of resources used for transmission of the second DCI may vary. When the UE detects the second DCI, it may attempt to receive data at a location other than the corresponding resource location. In this case, the aggregation level of the second DCI determined by the UE may be different from the actual aggregation level of the second DCI that is used for transmission. If the aggregation level of the second DCI determined by the UE is different from the aggregation level of the second DCI actually used for transmission, the UE may have trouble in receiving data.

In order to prevent this problem, the aggregation level information used for the second DCI may be transmitted in the second DCI.

Method 3

Figure 14:
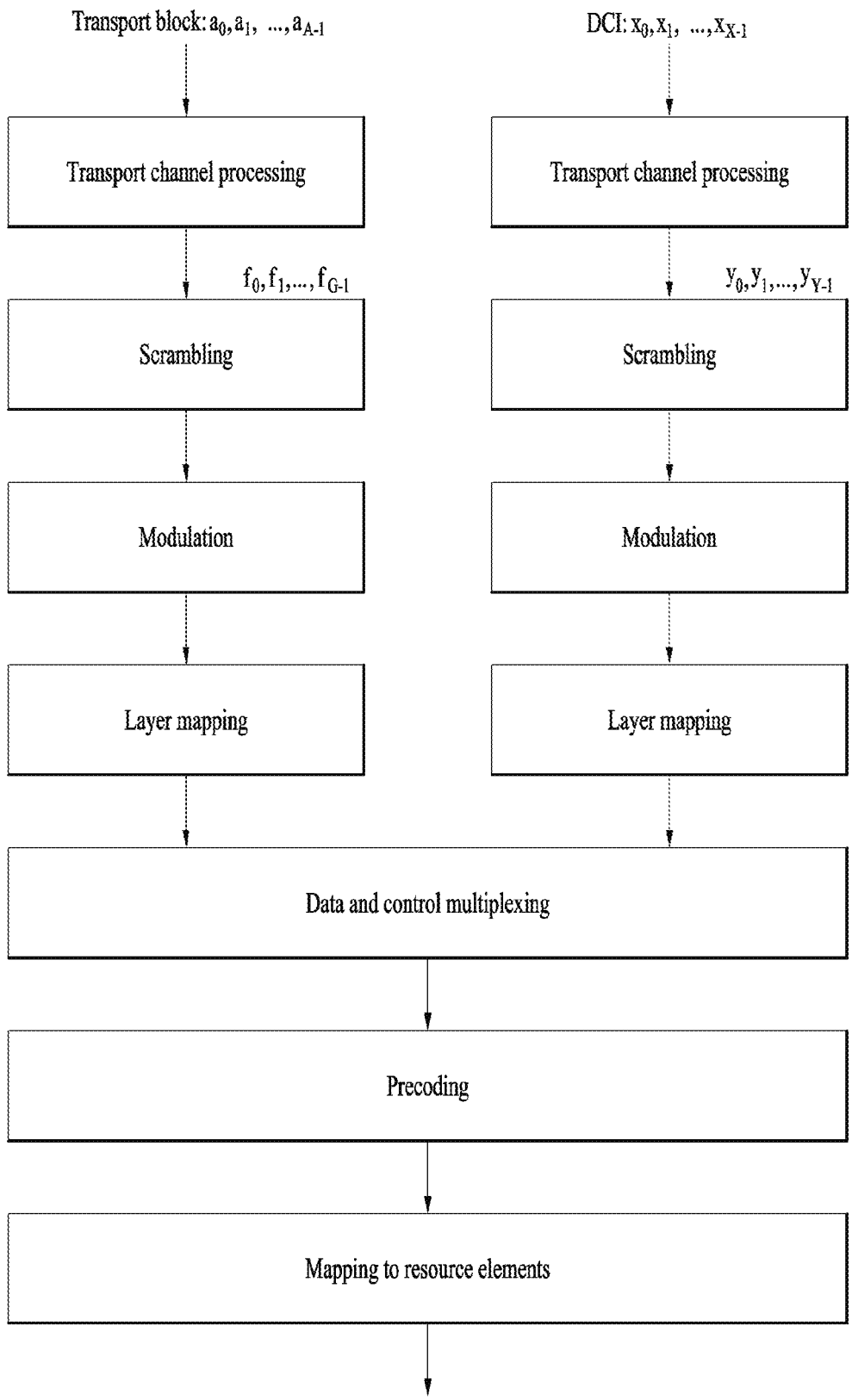

The existing transport channel processing procedure (e.g., CRC attachment, code block segmentation and code block CRC attachment, channel coding, rate-matching, and/or code block concatenation) may be performed on the data transport block, and a separate processing procedure (e.g., CRC attachment, channel coding and/or rate-matching) may be performed on the second DCI. For example, as shown in FIG. 14, the eNB may perform the existing transport channel processing procedure on the transport block $a_0, a_1, \ldots, a_{A-1}$ to obtain $f_0, f_1, \ldots, f_{G-1}$, and perform a separate processing procedure (e.g., CRC attachment, channel coding and/or rate matching) on DCI $x_0, x_1, \ldots, x_{X-1}$ to obtain $y_0, y_1, \ldots, y_{Y-1}$. Thereafter, the eNB may perform scrambling, modulation, and/or layer mapping on data (e.g., transport block) and control information (e.g., second DCI), respectively. Then, the eNB may multiplex/combine the control information and the data. Method 3 may mean that the transport block (PDSCH) is rate-matched in a second DCI transmission resource for transmission of the second DCI.

Multiplexing the data and the control information may be performed in the following procedure.

The control information and data may be combined in order of the control information and data. Thereby, the control information may be positioned in front of the data in the multiplexed sequence. According to this multiplexing procedure, when the multiplexed sequence is mapped to the PDSCH according to the frequency first resource mapping rule, the control information is mapped to the OFDM symbol(s) in the front part of the OFDM symbols allocated to the PDSCH in the time domain, and accordingly the UE may receive the DCI prior to the data.

Meanwhile, Method 3 may include multiplexing the control information and data after precoding thereof, instead of precoding the control information and data after multiplexing thereof.

In this case, the same transmission scheme and/or precoding are applied to the second DCI and the transport block, but a separate channel coding, code rate, antenna port number and location, and/or modulation order may be applied. In this case, the following information may be fixed or configured through the first DCI or RRC as common information to allow the UE to receive the second DCI and data (transport block):

Resource allocation (PRBs for PDSCH transmission);
Transmission mode; and/or
Precoding matrix related information.

Meanwhile, the following information may be fixed or configured through the first DCI or RRC to allow the UE to receive the second DCI.

Aggregation level (code rate or bit size after rate matching): Depending on the aggregation level of the PDCCH carrying the first DCI, the aggregation level applied to the second DCI may be determined, or the aggregation level set of the PDCCH_Y that the UE should monitor may be determined. Here, the aggregation level may mean the code rate, the amount of resources used for transmission of PDCCH_Y, or the number of bits of the second DCI after rate-matching.

Channel coding: Channel coding may be fixed to a specific channel coding technique.

Modulation order: The modulation order may always be fixed to BPSK or QPSK. Alternatively, the modulation order in which the second DCI is used may vary according to the aggregation level of the PDCCH over which the first DCI is transmitted.

Number of layers (or number of antenna ports) and/or antenna port index: The number of layers (or number of antenna ports) may be fixed to 1 or a specific value. If the number of layers is greater than 1, the same information may be repeatedly transmitted on each layer. For example, in the case where the control information is transmitted through 2 antenna ports, when a precoding matrix applied in a specific RE is $$P = \begin{bmatrix} p_{0,0} & p_{0,1} \\ p_{1,0} & p_{1,1} \end{bmatrix}$$

and symbols transmitted through each antenna port are $$X = \begin{bmatrix} x_0 \\ x_1 \end{bmatrix},$$

the same symbol (=s) may be transmitted as $x_0$ and $x_1$ in the RE used for transmission of the control information. Therefore, the values transmitted through the two antenna ports may be $$P \times X = \begin{bmatrix} p_{0,0} & p_{0,1} \\ p_{1,0} & p_{1,1} \end{bmatrix}\begin{bmatrix} x_0 \\ x_1 \end{bmatrix} = \begin{bmatrix} p_{0,0} & p_{0,1} \\ p_{1,0} & p_{1,1} \end{bmatrix}\begin{bmatrix} s \\ s \end{bmatrix} = \begin{bmatrix} p_{0,0} + p_{0,1} \\ p_{1,0} + p_{1,1} \end{bmatrix}s.$$

In addition, when the number of layers used for transmission of the DCI is N, the antenna port(s) used for transmission of the DCI may correspond to N antenna ports from the lowest index of the antenna ports for transmitting the PDSCH. Alternatively, the number of layers and antenna port indexes used for transmission of the DCI may be equal to the number of layers and antenna port indexes used for transmission of the data. In this case, the number of layers and the antenna port indexes for transmission of the control information and data may be fixed or configured through the first DCI or RRC.

In addition, in order to allow the UE to receive data (transport block), the following information may be fixed or configured through the first DCI, second DCI, or RRC.

MCS index (or transport block size, code rate, and/or modulation order) for PDSCH.

Channel coding: Channel coding may be fixed to a specific channel coding technique.

Number of layers (or number of antenna ports) and/or antenna port index: If the number of layers and antenna port indexes used for transmission of the control information are equal to the number of layers and the antenna port indexes used for transmission of the data, the number of layers and antenna port indexes for transmission of the control information and data may be fixed or configured through the first DCI or RRC.

The aggregation level (or code rate, or bit size after rate matching) of the second DCI may not be fixed or configured with one specific value. The UE may perform blind decoding on a plurality of aggregation levels. In this case, depending on the aggregation level of the second DCI, the locations and/or amount of resources used for transmission of the second DCI may vary. When the UE detects the second DCI, it may attempt to receive data at a location other than the corresponding resource location. In this case, the aggregation level of the second DCI determined by the UE may be different from the actual aggregation level used for the second DCI. If the aggregation level determined by the UE is different from the actual aggregation level that is used, the UE may have trouble in receiving data. In order to prevent this problem, the second DCI may be transmitted including the aggregation level information used for the second DCI.

Method 4

Figure 15:
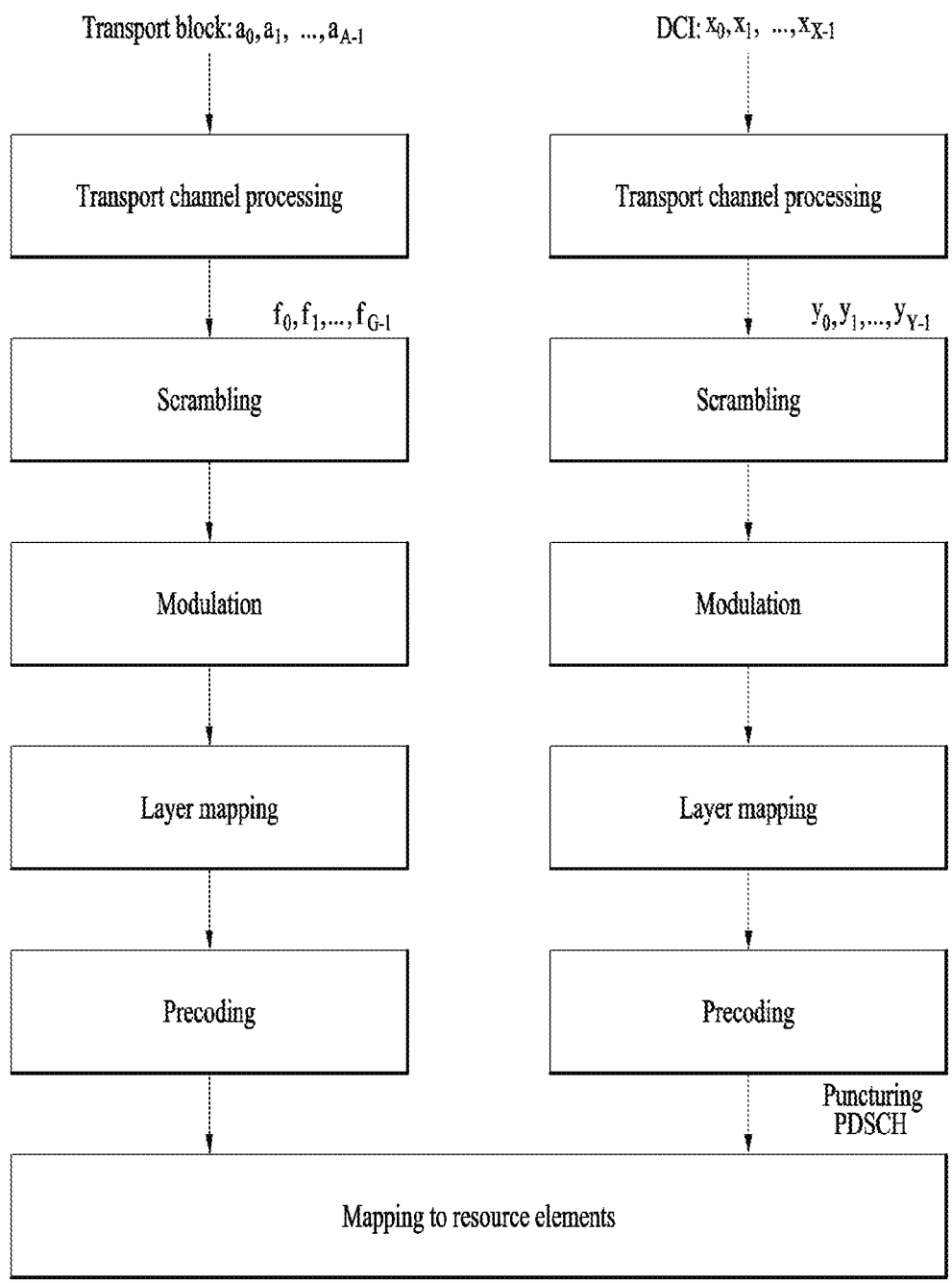

The eNB may perform the existing transport channel processing procedure (e.g., CRC attachment, code block segmentation and code block CRC attachment, channel coding, rate matching, and/or code block concatenation) on the data transport block and perform separate processing (CRC attachment, channel coding and/or rate-matching) on the second DCI. For example, as shown in FIG. 15, the eNB may perform the existing transport channel processing procedure on the transport block $a_0, a_1, \ldots, a_{A-1}$ to obtain $f_0, f_1, \ldots, f_{G-1}$, and perform a separate processing procedure (e.g., CRC attachment, channel coding and/or rate matching) on DCI $x_0, x_1, \ldots, x_{X-1}$ to obtain $y_0, y_1, \ldots, y_{Y-1}$. Thereafter, the eNB may perform scrambling, modulation, layer mapping, and/or precoding on data (transport block) and control information (second DCI), respectively. Thereafter, in performing resource mapping of the control information and data, the eNB may perform resource mapping of the data first. Resource mapping of the control information may be performed by puncturing data transmission resources.

In this case, the procedure of puncturing data by the control information may be performed as follows.

In order to transmit control information, the control information may puncture the data in order of frequency first and time second from the OFDM symbol(s) area in the front part of the data RE. Thereby, among the OFDM symbols used for transmission of the PDSCH, the control information is transmitted in the OFDM symbols preceding the data, such that the UE may receive the DCI prior to the data.

In this case, the same transmission scheme and/or precoding are applied to the second DCI and the transport block, but a separate channel coding, code rate, antenna port number and location, and/or modulation order may be applied. The following information may be fixed or configured through the first DCI or RRC as common information to allow the UE to receive the second DCI and data (transport block):

Resource allocation (PRBs for PDSCH transmission);
Transmission mode; and/or
Precoding matrix related information.

Meanwhile, the following information may be fixed or configured through the first DCI or RRC to allow the UE to receive the second DCI.

Aggregation level (code rate or bit size after rate matching): Depending on the aggregation level of the PDCCH carrying the first DCI, the aggregation level of the second DCI may be determined, or the aggregation level set of the PDCCH_Y that the UE should monitor may be determined. Here, the aggregation level may mean the code rate, the amount of resources used for transmission of PDCCH_Y, or the number of bits of the second DCI after rate-matching.

Channel coding: Channel coding may be fixed to a specific channel coding technique.

Modulation order: The modulation order may always be fixed to BPSK or QPSK. Depending on the aggregation level of the PDCCH carrying the first DCI, the modulation order applied to the second DCI may vary.

Number of layers (or antenna ports) and/or antenna port index: The number of layers (or number of antenna ports) may be fixed to 1 or a specific value. If the number of layers is greater than 1, the same information may be repeatedly transmitted on each layer. For example, in the case where the control information is transmitted through 2 antenna ports, when a precoding matrix applied in a specific RE is $$P = \begin{bmatrix} p_{0,0} & p_{0,1} \\ p_{1,0} & p_{1,1} \end{bmatrix}$$

and symbols transmitted through each antenna port are $$X = \begin{bmatrix} x_0 \\ x_1 \end{bmatrix},$$

the same symbol (=s) may be transmitted as $x_0$ and $x_1$ in the RE used for transmission of the control information. Therefore, the values transmitted through the two antenna ports may be $$P \times X = \begin{bmatrix} p_{0,0} & p_{0,1} \\ p_{1,0} & p_{1,1} \end{bmatrix} \begin{bmatrix} x_0 \\ x_1 \end{bmatrix} = \begin{bmatrix} p_{0,0} & p_{0,1} \\ p_{1,0} & p_{1,1} \end{bmatrix} \begin{bmatrix} s \\ s \end{bmatrix} = \begin{bmatrix} p_{0,0} + p_{0,1} \\ p_{1,0} + p_{1,1} \end{bmatrix} s.$$

In addition, when the number of layers used for transmission of the DCI is N, the antenna port(s) used for transmission of the DCI may correspond to N antenna ports from the lowest index of the antenna ports for transmitting the PDSCH. Alternatively, the number of layers and antenna port indexes used for transmission of the DCI may be equal to the number of layers and the antenna port indexes used for transmission of the data. In this case, the number of layers and the antenna port indexes for transmission of the control information and data may be fixed or configured through the first DCI or RRC.

In addition, in order to allow the UE to receive data (transport block), the following information may be fixed or configured through the first DCI, second DCI, or RRC.

MCS index (or transport block size, code rate, and/or modulation order) for PDSCH.

Channel coding: Channel coding may be fixed to a specific channel coding technique.

Number of layers (or number of antenna ports) and/or antenna port index: If the number of layers and antenna port indexes used for transmission of the control information are equal to the number of layers and the antenna port indexes used for transmission of the data, the number of layers and antenna port indexes for transmission of the control information and data may be fixed or configured through the first DCI or RRC.

The aggregation level (or code rate, or bit size after rate matching) of the second DCI may not be fixed or configured with one specific value. Instead, the UE may perform blind decoding on a plurality of aggregation levels. In this case, depending on the aggregation level of the second DCI, the locations and/or amount of resources occupied by the second DCI may vary. When the UE detects the second DCI, it may attempt to receive data at a location other than the corresponding resource location. In this case, the aggregation level of the second DCI determined by the UE may differ from the aggregation level actually used for transmission of the second DCI. If the aggregation level determined by the UE is different from the aggregation level actually used, the UE may have trouble in receiving data. In order to prevent such a problem, the second DCI may be transmitted including the aggregation level information used for transmission of the second DCI.

Figure 16:
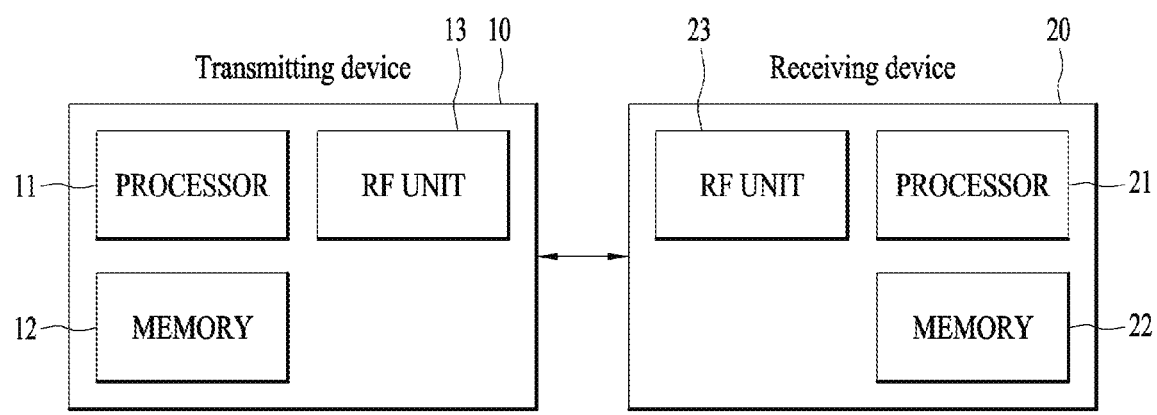
FIG. 16 is a block diagram illustrating elements of a transmitting device 10 and a receiving device 20 for implementing the present invention.

FIG. 16 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may configure an sTTI for a channel band, i.e., all or some frequency resources of the system band. The eNB processor may configure one or more sTTIs within a default TTI. The eNB processor may control the eNB RF unit to transmit frequency information indicating the frequency resource for which the sTTI is configured and/or information indicating a time resource for which the sTTI is configured.

The eNB processor according to the present invention may control the eNB RF unit to transmit downlink control information according to one of the above-described proposals of the present invention. The eNB processor may control the eNB RF unit to transmit downlink data according to one of the above-described proposals of the present invention. The eNB processor may control the eNB RF unit to transmit configuration information according to one of the above-described proposals of the present invention to the UE.

The UE processor according to the present invention may control the UE RF unit to receive downlink control information according to one of the above-described proposals of the present invention. The UE processor may control the UE RF unit to receive downlink data according to one of the above-described proposals of the present invention. The UE processor may control the UE RF unit to receive configuration information according to one of the above-described proposals of the present invention.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method of receiving downlink (DL) control information (DCI), the method performed by a user equipment and comprising:
    decoding a set of physical downlink control channel (PDCCH) candidates in a search space;
    obtaining a first DCI for scheduling a second DCI from the decoded PDCCH candidates in the search space;
    receiving a combined transport block through a physical DL shared channel (PDSCH) based on the first DCI;
    blind decoding on a plurality of aggregation levels including an aggregation level of the second DCI;
    detecting the second DCI based on the aggregation level of the second DCI; and
    detecting a data transport block at a resource location other than a resource location corresponding to the second DCI,
    wherein the first DCI includes information on resource blocks for the PDSCH, a modulation coding scheme (MCS) index, a transmission mode, number of antenna ports, or a precoding matrix,
    wherein the combined transport block is a combination of the second DCI and a data transport block,
    wherein the data transport block is rate-matched in resource for transmission of the second DCI,
    wherein the aggregation level of the second DCI is determined based on an aggregation level of the PDCCH carrying the first DCI,
    wherein the second DCI includes information on the aggregation level of the second DCI, and
    wherein the resource location used for transmission of the second DCI is varied depending on the aggregation level of the second DCI.

2. The method according to claim 1, wherein the DL data is smaller than a predetermined size.

3. The method according to claim 1, wherein:
    the search space is configured in a control region of a first transmission time interval (TTI) having a first time length;
    the first DCI is valid within at least the first TTI;
    the second DCI is valid only within one second TTI having a second time length; and
    the first TTI is divided into the control region and a data region following the control region in a time domain.

4. The method according to claim 3, wherein:
    the first time length is 1 ms; and
    the second time length is shorter than or equal to 0.5 ms.

5. The method according to claim 3, wherein the one second TTI is configured in the data region of the first TTI.

6. The method according to claim 1, wherein the search space is a common search space.

7. The method according to claim 1, wherein:
    the first DCI has a first DCI format, and the second DCI has a second DCI format, and
    the first DCI format and the second DCI format are different from each other.

8. A user equipment (UE) for receiving downlink (DL) control information (DCI), the UE comprising:
    a transceiver; and
    a processor configured to control the transceiver and to:
        decode a set of physical downlink control channel (PDCCH) candidates in a search space;
        obtain a first DCI for scheduling a second DCI from the decoded PDCCH candidates;
        control the transceiver to receive a combined transport block through a physical DL shared channel (PDSCH) based on the first DCI;
        blind decode on a plurality of aggregation levels including an aggregation level of the second DCI;
        detect the second DCI based on the aggregation level of the second DCI; and
        detect a data transport block at a resource location other than a resource location corresponding to the second DCI,
    wherein the first DCI includes information on resource blocks for the PDSCH, a modulation coding scheme (MCS) index, a transmission mode, number of antenna ports, or a precoding matrix,
    wherein the combined transport block is a combination of the second DCI and a data transport block,
    wherein the data transport block is rate-matched in resource for transmission of the second DCI,
    wherein the aggregation level of the second DCI is determined based on an aggregation level of the PDCCH carrying the first DCI,
    wherein the second DCI includes information on the aggregation level of the second DCI, and
    wherein the resource location used for transmission of the second DCI is varied depending on the aggregation level of the second DCI.

9. The user equipment according to claim 8, wherein the data transport block is smaller than a predetermined size.

10. The user equipment according to claim 8, wherein:
    the search space is configured in a control region of a first transmission time interval (TTI) having a first time length;
    the first DCI is valid within at least the first TTI;
    the second DCI is valid only within one second TTI having a second time length; and
    the first TTI is divided into the control region and a data region following the control region in a time domain.

11. The user equipment according to claim 10, wherein:
    the first time length is 1 ms; and
    the second time length is shorter than or equal to 0.5 ms.

12. The user equipment according to claim 10, wherein the one second TTI is configured in the data region of the first TTI.

13. The user equipment according to claim 8, wherein the search space is a common search space.

14. The user equipment according to claim 8, wherein:
    the first DCI has a first DCI format, and the second DCI has a second DCI format, and
    the first DCI format and the second DCI format are different from each other.

15. A method of transmitting downlink control information (DCI), the method performed by a base station and comprising:
    encoding a first DCI for scheduling a second DCI;
    encoding the second DCI on an aggregation level among a plurality of aggregation levels including the aggregation level of the second DCI;

transmitting the first DCI in a set of physical downlink control channel (PDCCH) candidates in a search space;
transmitting a combined transport block through a physical DL shared channel (PDSCH) based on the first DCI;
transmitting the second DCI based on the aggregation level of the second DCI; and
transmitting a data transport block at a resource location other than a resource location corresponding to the second DCI,
wherein the first DCI includes information on resource blocks for the PDSCH, a modulation coding scheme (MCS) index, a transmission mode, number of antenna ports, or a precoding matrix,
wherein the combined transport block is a combination of the second DCI and a data transport block,
wherein the data transport block is rate-matched in resource for transmission of the second DCI,
wherein the aggregation level of the second DCI is determined based on an aggregation level of the PDCCH carrying the first DCI,
wherein the second DCI includes information on the aggregation level of the second DCI, and
wherein the resource location used for transmission of the second DCI is varied depending on the aggregation level of the second DCI.

16. A base station (BS) for transmitting downlink control information (DCI), the BS comprising:
a transceiver; and
a processor connected to the transceiver, and the processor configured to:
encode a first DCI for scheduling a second DCI,
encode the second DCI on an aggregation level among a plurality of aggregation levels including the aggregation level of the second DCI; and
control the transceiver to:
transmit the first DCI in a set of physical downlink control channel (PDCCH) candidates in a search space,
transmit a combined transport block through a physical DL shared channel (PDSCH) based on the first DCI,
transmit the second DCI based on the aggregation level of the second DCI, and
transmit a data transport block at a resource location other than a resource location corresponding to the second DCI,
wherein the first DCI includes information on resource blocks for the PDSCH, a modulation coding scheme (MCS) index, a transmission mode, number of antenna ports, or a precoding matrix,
wherein the combined transport block is a combination of the second DCI and a data transport block,
wherein the data transport block is rate-matched in resource for transmission of the second DCI,
wherein the aggregation level of the second DCI is determined based on an aggregation level of the PDCCH carrying the first DCI,
wherein the second DCI includes information on the aggregation level of the second DCI, and
wherein the resource location used for transmission of the second DCI is varied depending on the aggregation level of the second DCI.

* * * * *